(12) United States Patent
Derrick et al.

(10) Patent No.: US 12,017,857 B2
(45) Date of Patent: Jun. 25, 2024

(54) LOADING APPARATUS

(71) Applicant: RENISHAW PLC, Wotton-under-Edge (GB)

(72) Inventors: Hugo George Derrick, Stroud (GB); Stephen Paul Hunter, Bristol (GB); James Richard Philip Huntley, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 74 days.

(21) Appl. No.: 17/631,703

(22) PCT Filed: Aug. 3, 2020

(86) PCT No.: PCT/GB2020/051859
§ 371 (c)(1),
(2) Date: Jan. 31, 2022

(87) PCT Pub. No.: WO2021/023984
PCT Pub. Date: Feb. 11, 2021

(65) Prior Publication Data
US 2022/0267097 A1 Aug. 25, 2022

(30) Foreign Application Priority Data
Aug. 8, 2019 (EP) .................................... 19190696

(51) Int. Cl.
*B65G 13/10* (2006.01)
*B65G 35/06* (2006.01)
(Continued)

(52) U.S. Cl.
CPC ............. *B65G 13/10* (2013.01); *B65G 47/53* (2013.01); *B65G 47/54* (2013.01); *B65G 35/06* (2013.01);
(Continued)

(58) Field of Classification Search
CPC .......... B65Q 7/14; B65G 13/10; B65G 35/06; B65G 47/53; B65G 47/54; B65G 2207/34; B65G 2201/0267
See application file for complete search history.

(56) References Cited

U.S. PATENT DOCUMENTS 4,144,960 A * 3/1979 Scourtes ................ B65G 37/02
198/346.2
4,976,025 A * 12/1990 Aldridge, Jr. ........ B23Q 7/1426
29/33 P
(Continued)

FOREIGN PATENT DOCUMENTS

AT 404329 B 10/1998
CN 2787768 Y 6/2006
(Continued)

OTHER PUBLICATIONS

Oct. 7, 2020 International Search Report issued in International Patent Application No. PCT/GB2020/051859.
(Continued)

*Primary Examiner* — James R Bidwell
(74) *Attorney, Agent, or Firm* — Oliff PLC

(57) ABSTRACT

A pallet loader for a positioning apparatus, including at least two pallet bays and at least one intermediate member, arranged such that at least two pallet bays are located on different sides of the intermediate member, such that at least one pallet can be driven i) from one pallet bay to another, and ii) from one pallet bay to a positioning apparatus, in which the apparatus includes cooperating guide features on the underside of the at least one pallet and on one or more of the intermediate member and pallet bays for guiding the pallet along a predetermined path and/or for controlling the rotational orientation of the pallet about a vertical axis, as the pallet moves across the intermediate member/pallet bay.

14 Claims, 12 Drawing Sheets

(51) Int. Cl.
  *B65G 47/53* (2006.01)
  *B65G 47/54* (2006.01)
(52) U.S. Cl.
  CPC .. *B65G 2201/0267* (2013.01); *B65G 2207/34* (2013.01)

(56) References Cited

U.S. PATENT DOCUMENTS

| | | | |
|---|---|---|---|
| 5,156,254 | A | 10/1992 | Kitamura et al. |
| 5,248,236 | A | 9/1993 | Ooshima et al. |
| 5,997,241 | A * | 12/1999 | Malcolm ............... B23Q 7/1431 414/806 |
| 6,098,268 | A * | 8/2000 | Negre ................... B23P 21/004 198/346.2 |
| 6,138,188 | A * | 10/2000 | Hou .................... G06F 12/0802 710/52 |
| 7,040,477 | B2 | 5/2006 | Brixius et al. |
| 7,861,430 | B2 | 1/2011 | Jonas et al. |
| 7,878,319 | B2 | 2/2011 | Costanzo et al. |
| 8,474,148 | B2 | 7/2013 | Jonas et al. |
| 9,233,803 | B2 | 1/2016 | Pilarz et al. |
| 10,071,864 | B2 | 9/2018 | Saito |
| 10,081,495 | B2 | 9/2018 | Moller |
| 2004/0168888 | A1 | 9/2004 | Brixius et al. |
| 2008/0302634 | A1 | 12/2008 | Costanzo et al. |
| 2009/0025244 | A1 | 1/2009 | Jonas et al. |
| 2011/0061253 | A1 | 3/2011 | Jonas et al. |
| 2014/0014468 | A1 | 1/2014 | Pilarz et al. |
| 2015/0175362 | A1 | 6/2015 | Saito |
| 2016/0340125 | A1 | 11/2016 | Møller |
| 2020/0339348 | A1 * | 10/2020 | Durai .................... B66F 9/063 |
| 2021/0351721 | A1 * | 11/2021 | Chitragar ............... B65G 39/09 |

FOREIGN PATENT DOCUMENTS

| | | | | |
|---|---|---|---|---|
| CN | 101815658 | A | 8/2010 | |
| CN | 101395075 | B | 8/2012 | |
| CN | 103662690 | A | 3/2014 | |
| CN | 104411603 | A | 3/2015 | |
| CN | 104507834 | A | 4/2015 | |
| CN | 105438801 | A | 3/2016 | |
| CN | 105980275 | A | 9/2016 | |
| CN | 107757752 | A | 3/2018 | |
| CN | 207807234 | U | 9/2018 | |
| CN | 207844349 | U | 9/2018 | |
| DE | 37 33 585 | C1 | 1/1989 | |
| DE | 9001573 | U1 | 4/1990 | |
| DE | 3910388 | C1 | 8/1990 | |
| DE | 102015202819 | A1 | 8/2016 | |
| EP | 0436034 | A1 | 7/1991 | |
| EP | 1454853 | A1 | 9/2004 | |
| EP | 1612510 | A2 | 1/2006 | |
| GB | 2123722 | A | 2/1984 | |
| GB | 2506209 | A | 3/2014 | |
| JP | H06-239451 | A | 8/1994 | |
| JP | 2017-160015 | A | 9/2017 | |
| KR | 20100109639 | * | 10/2010 | ............. B65G 57/24 |
| KR | 10-2540354 | * | 6/2023 | ............. B65G 57/14 |
| WO | 91/01196 | * | 2/1991 | ............... B23Q 7/00 |
| WO | 2007/093789 | A1 | 8/2007 | |

OTHER PUBLICATIONS

Oct. 7, 2020 Written Opinion issued in International Patent Application No. PCT/GB2020/051859.
Feb. 7, 2020 Search Report issued in European Patent Application No. 19190696.5.
"Moving Right Along". Innovation Metrology Special, 2018, vol. 21, pp. 90-95.
Zeiss One.Stop.Solution—More possibilities with Zeiss Prismo.
Zeiss One.Stop.Solution—Zeiss Prismo fortis with an automated loading system.
Zeiss One.Stop Solution—A modular system with endless possibilities. <URL: https://www.zeiss.co.uk/metrology/solutions/cmm-solutions.html>, accessed Mar. 4, 2019.
Screenshots from a video, <URL: https://www.zeiss.co.uk/metrology/solutions/cmm-solutions.html>, accessed Mar. 4, 2019.
Zeiss One.Stop.Solution—A modular system with endless possibilities. <URL: https://www.zeiss.co.uk/metrology/solutions/cmm-solutions.html>, accessed Jun. 25, 2019.
Zeiss One.Stop Solution—Duplex system for ZEISS DuraMax. <URL: https://www.zeiss.co.uk/metrology/solutions/cmm-solutions/duramax.html>, accessed on Jun. 25, 2019.
Renishaw—Shuttle and part transfer systems. <URL: https//www.renishaw.com/en/shuttle-and-part-transfer-systems-42701>, accessed on Jul. 24, 2019.
CAD drawings and phots of a Renishaw-ACE pallet loader supplied to a customer in Canada in early 2019—before the priority date.
Images of another pallet loader sold by ACE prior to claimed priority date.
"Equator Programmable Gauges Help Create the Ultimate Automation Cell for Bearing Machining and Parts Sorting". Case Study, Renishaw.
Modular Engineering—EasyLoad.

* cited by examiner

LOADING APPARATUS

This invention relates to a loading apparatus (also known as a "loading system"), in particular a pallet loader. In particular, this invention relates to a pallet loader for a positioning apparatus, such as a coordinate positioning apparatus, for example for a coordinate measuring machine (CMM).

Pallet loaders for positioning apparatus such as CMMs are known.

CMM pallet loaders typically comprise a table-like structure which sits beside a CMM and enables one or more pallets (each of which can carry one or more parts), to be loaded onto/off the CMM. Each pallet can be moved to and from a "transfer position" on the pallet loader; i.e. a position in which the pallet and part can be transferred from/to the loading apparatus to/from the CMM. Typically, a pallet loader is free-standing, and is not rigidly secured to the CMM.

Known loading apparatus include a rotating table. The rotating table comprises two pallet bays which can be rotated about an axis, so as to bring one or the other of the two pallet bays into the transfer position, such that the pallet and part can then be moved onto the CMM (or vice versa).

Another known loading apparatus is a shuttle table, which comprises a number of pallet bays (e.g. four), and a shuttle member which can move between the transfer position and to a position adjacent to any of the pallet bays. Accordingly, the shuttle member can receive a pallet with a part on it from any of the pallet bays and carry it to the transfer position, such that the pallet and part can then be moved onto the CMM (or vice versa).

The present invention relates to an improved pallet loader.

According to a first aspect of the invention there is provided an apparatus comprising at least one pallet and at least one pallet loader for storing a plurality of pallets which can be transferred from the pallet loader onto a positioning apparatus' pallet receiving member which is located adjacent the pallet loader, the apparatus comprising cooperating guide features on the underside of the at least one pallet and on at least a part of the pallet loader for guiding the pallet along a predetermined path and/or for controlling the rotational orientation of the pallet, as the pallet moves across at least said part of the pallet loader.

The pallet loader could comprise at least two pallet bays and at least one intermediate member. The intermediate member could be arranged such that a pallet can be driven across the intermediate member i) from one pallet bay to another, and ii) from one pallet bay to a positioning apparatus. The intermediate (or "transfer") platform can be configured to be immovable relative to the at least two pallet bays. For instance, the intermediate member can be secured to the pallet bays such that in normal use/operation it is not designed or configured to be moveable relative to the pallet bays. Rather, the intermediate member is designed/configured to remain static. Providing such an immovable (or "static" or "fixed") intermediate (or "transfer") member can avoid the need for a moving member to carry the pallet between bays to/from the positioning apparatus (e.g. to/from the so-called transfer position).

As mentioned above, the pallet loader can comprise a table-like structure, for location next to a positioning apparatus (such as a CMM). The table/table-like structure could comprise at least two pallet bays. The table/table-like structure could comprise at least one intermediate member. Accordingly, the pallet loader can comprise a support structure (e.g. one or more legs and/or feet) for supporting the at least two pallet bays (and optionally the at least one intermediate member) in a position raised off the floor. The table can be free-standing in that it is not rigidly secured or mounted to the positioning apparatus, e.g. such that vibrations and/or small motions/distortions of the positioning apparatus and/or table are not transferred through to each other. Optionally, the table can be fastened to the floor next to the positioning apparatus, e.g. by one or more fasteners, to stop it moving out of position.

As explained in more detail below, the so-called transfer position could be on/provided by an intermediate (or "transfer") member. However, this need not necessarily be the case. For example, another member or platform (e.g. a retractable bridge as explained in more detail below) could sit between a pallet bay/intermediate member and a positioning apparatus (e.g. a CMM) when in use. Therefore, this other member or platform could provide the so-called transfer position. This other member could be part of the pallet loader.

Guide features on the pallet loader could be configured to interact with one or more (complementary) guide features on the underside of the pallet. Together, such guide features can provide the cooperating guide features. One or more of the above-mentioned pallet bays and/or the intermediate member can comprise one or more guide features.

The cooperating guide features can be configured to control/guide the rotational orientation of the pallet (e.g. about a vertical axis) as it moves along at least a part of the pallet loader (e.g. along the intermediate member). Accordingly, the rotational orientation of the pallet about all three axes of rotation can be controlled/guided by the pallet loader.

The guide features of the pallet loader (e.g. of the intermediate member and/or pallet bay(s)) can be configured to interact with the one or more guide features on the underside of the pallet so as to control/guide the (horizontal) motion of the pallet (along a predetermined path/degree of freedom) as it moves relative to/across at least a part of the pallet loader (e.g. across a pallet bay(s) and/or intermediate member). Such a guided (in other words, predetermined) path/degree of freedom/direction could be a linear path/degree of freedom/direction. In other words, the apparatus can comprise cooperating guide features on the underside of the pallet and on the pallet loader (e.g. one or more of the intermediate member and pallet bays) which control/guide the pallet as it moves across at least a part of the pallet loader (e.g. intermediate member/pallet bay). In other words, such (cooperating) guide features can be configured so to guide (e.g. constrain) the rotational and/or lateral position of at least one pallet as it moves relative to/across at least a part of the pallet loader (e.g. pallet bay/intermediate member) (along the predetermined path/degree of freedom). For example, such guide features can be configured to permit the pallet to move relative to (e.g. be driven/trundle over) the pallet loader (e.g. a pallet bay and/or intermediate member) along a (first) predetermined (e.g. linear) path/degree of freedom ("a guided path/degree of freedom"), but restrict/prevent rotational motion and/or linear motion of the pallet in a degree of freedom perpendicular to said predetermined path/degree of freedom. Accordingly, as will be understood, the guide features can constrain/restrict the lateral position of the pallet relative to the pallet loader in both (of the opposing) directions along the dimension which extends perpendicular to the predetermined (e.g. linear) path/degree of freedom. This can be the case for the intermediate member as well as the pallet bays (except at the below-described "escape" positions on the intermediate member).

As will be understood, the guide features can be "inactive" or "unpowered" (rather than "active" or "powered") guide features in that they do not effect/drive any motion of a pallet relative to the pallet loader. In other words, the guide features are not themselves driven (e.g. by motorised/powered means). Rather, the guide features guide the motion of a pallet, wherein such motion is effected/caused by other means, such as for example an operator, or as explained in more detail below, a drive mechanism.

The guide features could be configured such that the pallet can change the path/degree of freedom along which it can move (e.g. along which it is guided) at least at one predetermined position on the pallet loader (e.g. at least at one predetermined position on the intermediate member). For instance, the pallet loader (e.g. at least the intermediate member) and/or pallet can be configured such that at least at one predetermined position (along the predetermined/guided path/degree of freedom), the pallet can escape from the (first) guided path/degree of freedom and can move along a different path/direction/degree of freedom, which could be guided or unguided (for instance so that it can move into a pallet bay which is located laterally with respect to the guided path/degree of freedom). For example, the one or more guide features on the pallet (e.g. on at least the intermediate member), and the one or more (complementary) guide features on the underside of the pallet, can be configured such that the pallet can move along a second degree of freedom (for instance so that it can move into a pallet bay which is located laterally with respect to the guided path/degree of freedom), at a predetermined position. Such a predetermined position could be a junction between two or more guided paths/degrees of freedom (e.g. a junction between two or more sets of guide features on the intermediate member). The pallet loader (e.g. at least the intermediate member) can comprise one or more guide features which can interact with one or more (complementary) guide features on the underside of the pallet so as to guide (e.g. constrain) the lateral position of at least one pallet along a second predetermined (e.g. linear) path/degree of freedom ("a guided path/degree of freedom"). The second guided path/degree of freedom could be orthogonal to the first guided path/degree of freedom, but this need not necessarily be the case.

The guide features on the pallet loader (e.g. on the pallet bay(s) and/or the intermediate member) could also be configured to (at least partially) support the weight of the pallet. In other words, the guide features could also be weight/load-bearing members.

The guide features could comprise non-mechanical members (e.g. non-mechanical bearings); for instance magnetic members on the pallet bay(s)/intermediate member and/or pallet. Preferably, the guide features comprise mechanical members (e.g. mechanical bearings) which facilitate guidance of the pallet by physical engagement/contact. Such mechanical guide members could comprise rotating bearing members, for example ball or roller bearings (and so could be referred to as a rotating guide bearing member). Such rotating bearing members could be provided on the pallet bay(s) and/or intermediate member. For example, the one or more guide features on the one or more pallet bays and/or on the intermediate member could comprise at least one rotatable bearing member, for example a ball or roller bearing. Additionally/alternatively, such rotating bearing members could be provided on the pallet(s). Balls can be a particularly preferred guiding bearing member. In particular, a ball bearing member can be configured to be free to rotate about all three orthogonal axes of rotation (e.g. about, x, y and z axes). As will be understood, the rotating bearing member can be configured such that it is translationally stationary (in other words, its location in three-dimensional space can be fixed). For example, a ball bearing member can be contained (or "trapped") in a fixed seat in which it is free to spin in all three rotational degrees of freedom.

The cooperating guide features can engage/interlock/mesh with each other. For example, a guide feature could comprise a channel (for example a "groove", "slot", or "recess") on one member, into which one or more guide features on the other member can be received. For example, a channel could be provided on the underside of the pallet, in which one or more mechanical bearings (e.g. ball or roller bearings) on the pallet bay(s) and/or intermediate member can be received. As will be understood, a channel could be provided in numerous different ways; for example, by continuous features, by arrays of features, static features and/or moveable features (e.g. such as two parallel arrays of rollers defining a channel). As mentioned above, a channel guide feature could be provided on the underside of the pallet. Nevertheless, a channel guide feature could be provided on the pallet loader (e.g. on the pallet bay(s) and/or intermediate member). Preferably, the channel(s) comprise groove(s), i.e. a long, narrow cut or depression in the material on which they are provided (e.g. preferably, on the underside of the pallet).

More than one guide feature (e.g. more than one channel) could be provided. For example, a plurality of parallel guide features (e.g. channels) could be provided. Optionally, at least one guide feature (e.g. channel) extends in a different direction, for example orthogonally, to another guide feature (e.g. channel). Such guide features (e.g. channels) extending in different directions could meet/join with (e.g. intersect) each other.

One or more "escape"/"access" features can be provided, via which the guide features on the pallet loader (e.g. on the pallet bay(s) and/or on the intermediate member) can escape or access/enter the guide feature(s) on the pallet (or vice versa) in a direction which is not along the (first) guided path/degree of freedom (e.g. in a second degree of freedom orthogonal to the first guided degree of freedom). For example, such an escape/access feature could comprise a channel (for example a "groove" or "recess"), for instance on the member which has the guide channels (e.g. on the underside of the pallet), such that the guide features on the other member (e.g. the pallet bay(s) and/or the intermediate member) can enter/exit the guide channels in a direction (e.g. in an orthogonal direction) other than along the guided degree of freedom/predetermined path. The width of such escape/access feature(s) (e.g. channel(s)) could be wider than the width of the guide feature(s) (e.g. guide channel(s)) such that the guide feature(s) have a greater lateral constraining effect on the pallet than the escape/access features. In other words, for example, the fit between: i) the guide features on the pallet loader (e.g. on the pallet bay(s) and/or intermediate member); and ii) the guide feature(s) on the pallet, can be tighter than the fit between: i) the guide features on the pallet loader (e.g. on the pallet bay(s) and/or intermediate member); and ii) the escape/access feature(s). Such escape/access features (e.g. channels) can extend in a different direction (e.g. orthogonally) to said guide features (e.g. channels). The escape/access features (e.g. channels) can meet/join with (e.g. intersect) said guide features. The provision of such escape features can avoid the need for a lifting mechanism which facilitates raising/lowering the pallet and/or the guide or bearing features out of the way of each other so as to permit a change of direction. Optionally, rather than being evenly/equally spaced in the direction along/parallel to the guided direction/predetermined path, the escape/access features for a guide feature (e.g. for a channel), (and the corresponding guide features on the other member) can be unevenly/irregularly spaced, e.g. such that multiple escape/access features on one member and the corresponding guide features on the other member can only align at one position (along the guided direction/predetermined path).

The apparatus can comprise means for automatically driving a pallet around the pallet loader. For instance, the apparatus can comprise a drive mechanism for automatically driving a pallet around the pallet loader. The pallet loader could comprise the drive mechanism. For example, the pallet loader could comprise one or more integral drive/conveyor belts for moving a pallet. Optionally, the drive mechanism is provided separately to the pallet loader. For example, one or more mechanical (e.g. robot) arms arranged separately to (e.g. sitting next to) the pallet loader could be provided, for pushing and/or pulling a pallet around the pallet loader.

A pallet and/or the pallet (e.g. one or more of the intermediate member and pallet bays) could comprise at least one non-guiding load-bearing bearing member which is arranged to support at least a proportion of the pallet's weight. Accordingly, such a non-guiding load-bearing bearing member could be configured so as not to provide any (lateral) guidance as the pallet moves relative to the pallet loader (e.g. the pallet bay/intermediate member). Optionally, a pallet and/or the pallet loader (e.g. one or more of the intermediate member and pallet bays) comprises a plurality of pallet-support bearing members which are arranged so as not to provide any (lateral/horizontal) guidance as the pallet moves relative to the pallet loader (e.g. relative to a pallet bay/intermediate member). The non-guiding load-bearing bearing members could be mechanical (e.g. roller/ball/sliding) bearing members or non-mechanical (e.g. air and/or magnetic) bearing members. In the case of the bearing members comprising balls, the balls can be free to rotate about all three orthogonal axes of rotation (e.g. about, x, y and z axes). As will be understood, the rotating bearing member can be configured such that it is translationally stationary (in other words, its location in three-dimensional space can be fixed). For example, a bearing ball bearing member can be contained (e.g. trapped) in a fixed seat in which it is free to spin in all three rotational degrees of freedom.

Pallet loaders which have bearing members in the form of balls, are commonly called ball-tables. Accordingly, the pallet loader according to the present invention could be a ball-table.

Optionally, the pallet and/or the non-guiding load-bearing bearing members on the pallet loader (e.g. on a pallet bay and/or the intermediate member), are configured such that a pallet mounts (in other words "boards") or dismounts (in other words "alights") not more than half of, preferably not more than a quarter of, for instance not more than two of, and more preferably not more than one of, the non-guiding load-bearing bearing members simultaneously as the pallet moves across (e.g. onto/off) the pallet table (e.g. across a pallet bay or intermediate member) (e.g. in the direction as guided/constrained by the guide bearing members). This can be particularly beneficial when the non-guiding load-bearing bearing members are mechanical/contact bearing members. For instance, the position of the load-bearing members could be staggered in the direction in which the pallet can travel. In other words, on the pallet loader (e.g. on one or more of the pallet bays and intermediate member), the non-guiding load-bearing members could be positioned (e.g. staggered relative to each other) such that no non-guiding load-bearing members are aligned in the direction(s) perpendicular to which a pallet can travel thereon. Additionally/alternatively, the leading/trailing edge of a pallet could extend non-perpendicularly to the direction of travel (in which case the load-bearing members could be arranged in-line, perpendicular to the direction of travel, if desired).

On the pallet loader (e.g. on one or more of the pallet bays and intermediate member), the non-guiding load-bearing members could be staggered relative to each other such that no non-guiding load-bearing members are aligned in the direction(s) in which a pallet can travel thereon (e.g. in the direction as guided/constrained by the guide bearing members). This can be helpful so as to distribute the load of the pallet across multiple contact lines. Again, this can be particularly beneficial when the non-guiding load-bearing members are mechanical/contact bearing members.

The one or more guide features can protrude further from the member it is mounted on (e.g. from the pallet bay(s)/intermediate member) than the non-guiding load-bearing members. In other words, the one or more guide features on the pallet loader (e.g. on the one or more pallet bays and intermediate member) can sit higher/be raised relative to the non-guiding load-bearing members (e.g. on the pallet bay/intermediate member). Accordingly, this can be such that the guide features (e.g. on the one or more pallet bay(s) and/or intermediate member) can extend/protrude into the guide features (and the escape/access features) so as to be captured by them, whereas the non-guiding load-bearing members do not extend/protrude into the guide features (and the escape/access features).

Accordingly, two sets of bearing member balls could be provided. A first set of balls could be provided which are configured at a first height (protrude from a plane by a first extent) and a second set of balls could be provided which are configured at a second height (protrude from the same plane by a second extent), different to the first height (first extent). For instance, the second set of balls could be configured at a greater height (e.g. they protrude from the plane by a greater extent) than the first set of balls. For instance, in the embodiments in which the guide members are provided on the pallet loader, the intermediate member and/or the pallet bay(s) of the pallet table (e.g. in this embodiment, the ball-table) could comprise the first and second sets of balls. The first and second sets of balls on the intermediate member and/or the pallet bay(s) could be configured such that the second set of balls extend into channels provided on the underside of a pallet thereon so as to guide the passage of the pallet, whereas the first set of balls engage the underside of the pallet so as to support its weight but do not extend into the channels. The first set of balls could be "non-guiding bearing balls" and the second set of balls could be "guiding balls". Preferably, the second set of balls are positioned only fractionally higher (or lower) than the first set of balls. The term "fractionally" is used literally in this context; in other words, preferably, the distance by which the second set of balls extend above the first set of balls is less than the diameter of the first set of balls. As will be understood, the different heights could be achieved by balls of different diameters positioned with their centre points at the same height, or by balls of the same (or different) diameter positioned with their centre points at different heights.

Preferably, the positions (in x, y and z) of the guide features/bearing members (e.g. the first and second sets of balls) on each of the pallet bay(s) and/or intermediate member is fixed. In other words, preferably, the guide features/bearing members (e.g. the first and second sets of balls) of the pallet table (ball table) are not configured to be translatable in any dimension (for instance, there is no lifting mechanism configured to change the height (e.g. z position) of the guide features/bearing member).

Preferably, the apparatus is configured such that at least one of (and for example all of) the rotatable bearing members (e.g. at least one of, optionally all of, the ball bearing members) is configured to provide bearing function (so as to help facilitate motion of the pallet), regardless of the direction in which the pallet is moving over the intermediate member. In other words, at least one of (and for example all of) the rotatable bearing members is used during relative motion regardless of the direction of motion (e.g. used during at least a part of the range of motion of the pallet in the first and second directions). Such an arrangement can avoid the need to provide a lifting mechanism for the (and for example all of) the rotatable bearing members to move them into and out of engagement (because they are used for both motion in all directions). This is not to say that such a rotatable bearing member provides bearing function (or is in engagement) for the full range of motion in all directions (e.g. in the first and second degrees of freedom); just that it is configured to provide bearing function (e.g. be in engagement) for at least a portion of the motion in all directions. This could be true of at least one rotatable guide bearing member and/or at least one non-guiding rotatable load bearing member. With regard to at least one rotatable guide bearing member, it need not provide a guiding function for motion of the pallet in all of the permitted directions of motion (e.g. in the first and second degrees of freedom). For example, it might guide motion whilst the pallet moves in one of the degrees of freedom, but provide a non-guiding load-bearing function whilst the pallet moves in the other degree of freedom.

The pallet loader could comprise at least one retractable bridge. The bridge could be located adjacent the above described intermediate member (such that in use it is located between the intermediate member and a positioning apparatus). Accordingly, the so-called "transfer position" could be on/provided by the retractable bridge. Optionally, the bridge is configured such that it is reconfigurable (e.g. movable) between a deployed position, in which a pallet can be driven across it to move the pallet to a positioning apparatus from the intermediate member (and vice versa) (without movement of the retractable bridge), and a retracted position (in which it no longer provides a path for a pallet on the pallet loader onto a positioning apparatus).

A retractable bridge can be helpful in that it in its retracted position it can be located out of the way so that a user can have improved/increased access to the positioning apparatus (in particular improved access to the end of the positioning apparatus via which pallets are loaded/unloaded). Accordingly, in the retracted position, the bridge could be sufficiently displaced from its deployed position, so as to create a bigger space in which a user can position themselves (e.g. in which a user can stand) (compared to the deployed position).

Optionally, the bridge can be changed from its deployed position to its retracted position by a pivoting action. Accordingly, the bridge could be hinged, and the bridge could pivot about the hinge. Optionally, the bridge can be changed from its deployed position to its retracted position by a linear (e.g. sliding) action.

Optionally, in the retracted position, the retractable bridge blocks the exit of a pallet from the pallet loader and/or positioning apparatus. In other words, in the retracted position, at least a part of the retractable bridge remains in the path between the pallet loader and positioning apparatus, e.g. in the path between the intermediate member and positioning apparatus, such that a pallet cannot fall off the pallet loader or a positioning apparatus into the space which is occupied by the bridge when it is in its deployed position. Optionally, the bridge is shorter than the pallet, e.g. such that in the case of the bridge being configured such that it can be laterally driven into its retracted position, the pallet blocks such lateral motion.

According to another aspect of the invention there is provided a pallet loader comprising at least one pallet bay comprising one or more guide features. This application also describes a ball-table comprising one or more guide features for guiding the pallet along a predetermined path and/or for controlling the rotational orientation of the pallet, as the pallet moves across the ball-table. Features described above in connection with the other embodiments of the invention are equally applicable to this embodiment. For example, such guide features could be configured to interact with one or more (complementary) guide features on the underside of a pallet. Together, such guide features could be referred to as cooperating guide features. The ball-table/pallet loader could comprise at least one pallet bay, and/or an intermediate member located adjacent a pallet bay. For example, the pallet loader could comprise a table (for arrangement next to a CMM) comprising at least two pallet bays and at least one intermediate member joined to the at least two pallet bays such that at least one pallet can be moved (or "transferred") from one pallet bay to another across the intermediate member. For instance, the at least two pallet bays and at least one intermediate member, could be arranged such that at least two pallet bays are located on different sides of the intermediate member, such that at least one pallet can be driven i) from one pallet bay to another, and ii) from one pallet bay to a positioning apparatus, across the intermediate member without movement of the intermediate member. Guide features on the pallet bay(s) and/or on any intermediate member can be configured to interact with one or more guide features on the underside of the pallet so as to guide the motion of the pallet (e.g. along a predetermined path/degree of freedom) as it moves relative to/across the pallet bay(s) and/or intermediate member. Such a guided (in other words, predetermined) path/degree of freedom/direction could be a linear path/degree of freedom/direction. In other words, the pallet loader can comprise cooperating guide features on the underside of the pallet and on one or more of the intermediate member and pallet bays which guide the pallet as it moves across the pallet bay/intermediate member. In other words, such (cooperating) guide features can be configured so to guide (e.g. constrain) the rotational and/or lateral position of at least one pallet as it moves relative to/across the pallet bay/intermediate member (along the predetermined path/degree of freedom). For example, such guide features can be configured to permit the pallet to move relative to (e.g. be driven/trundle over) a pallet bay and/or intermediate member along a (first) predetermined (e.g. linear) path/degree of freedom ("a guided path/degree of freedom"), but restrict/prevent rotational motion and/or linear motion of the pallet in a degree of freedom perpendicular to said predetermined path/degree of freedom. As also described above, the guide features could be configured such that the pallet can change the path/degree of freedom along which it can move (e.g. along which it is guided) at least at one predetermined position.

According to another aspect of the invention there is provided a pallet for a pallet loader for storing one or more pallets to be loaded onto a positioning apparatus. Features described above in connection with the pallet are equally applicable to this embodiment. For example, the pallet can comprise guide features (e.g. channels) on the underside of a pallet which are configured to interact with guide features on the pallet loader. The pallet can comprise guide features (e.g. channels) extending in two different (e.g. orthogonal) directions/degrees of freedom, such that the pallet can be guided along two different (e.g. orthogonal) directions/degrees of freedom. Such guide features (e.g. channels) can intersect. As also described above, the pallet can comprise escape/access features.

According to another aspect of the invention there is provided a pallet loader (e.g. ball-table) comprising at least one retractable bridge. Features described above in connection with the retractable bridge are equally applicable to this embodiment. The bridge could be located such that in use it is located adjacent a positioning apparatus. Accordingly, the so-called "transfer position" could be on/provided by the retractable bridge. Optionally, the bridge is configured such that it is reconfigurable (e.g. movable) between a deployed position, in which a pallet can be driven across it to move/transfer the pallet to/from a positioning apparatus (e.g. without movement of the retractable bridge), and a retracted position (in which it no longer provides a path for a pallet on the pallet loader onto a positioning apparatus). Optionally, the bridge can be changed from its deployed position to its retracted position by a pivoting action. Accordingly, the bridge could be hinged, and the bridge could pivot about the hinge. Optionally, in the retracted position, the retractable bridge blocks the exit of a pallet from the pallet loader and/or positioning apparatus.

According to another aspect of the invention there is provided a positioning apparatus for inspecting and/or working on a workpiece (for example a CMM or a machine tool), and a pallet loader according to any of the above-mentioned embodiments located adjacent the positioning apparatus, for storing pallets which can be moved to and from the positioning apparatus.

Embodiments of the invention will now be described, by way of example only, with reference to the following drawings, in which.

Figure 6A:
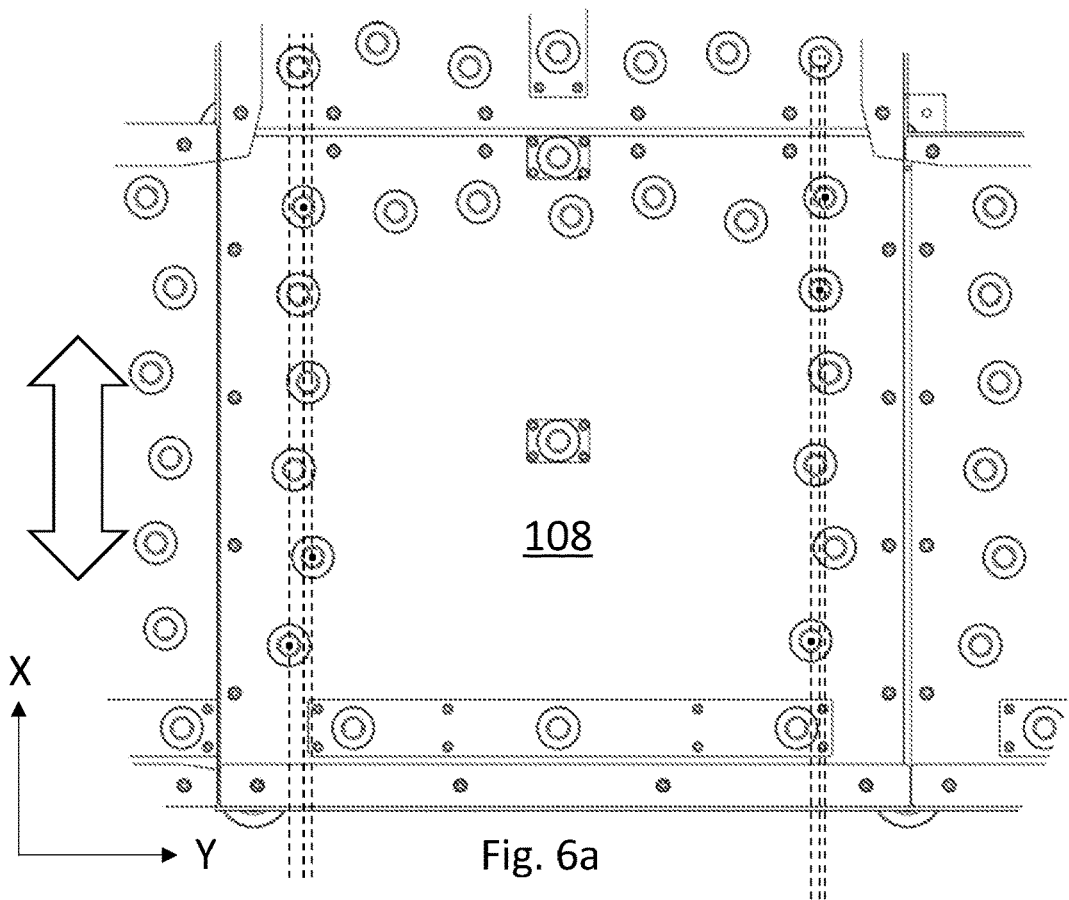
Figure 6B:
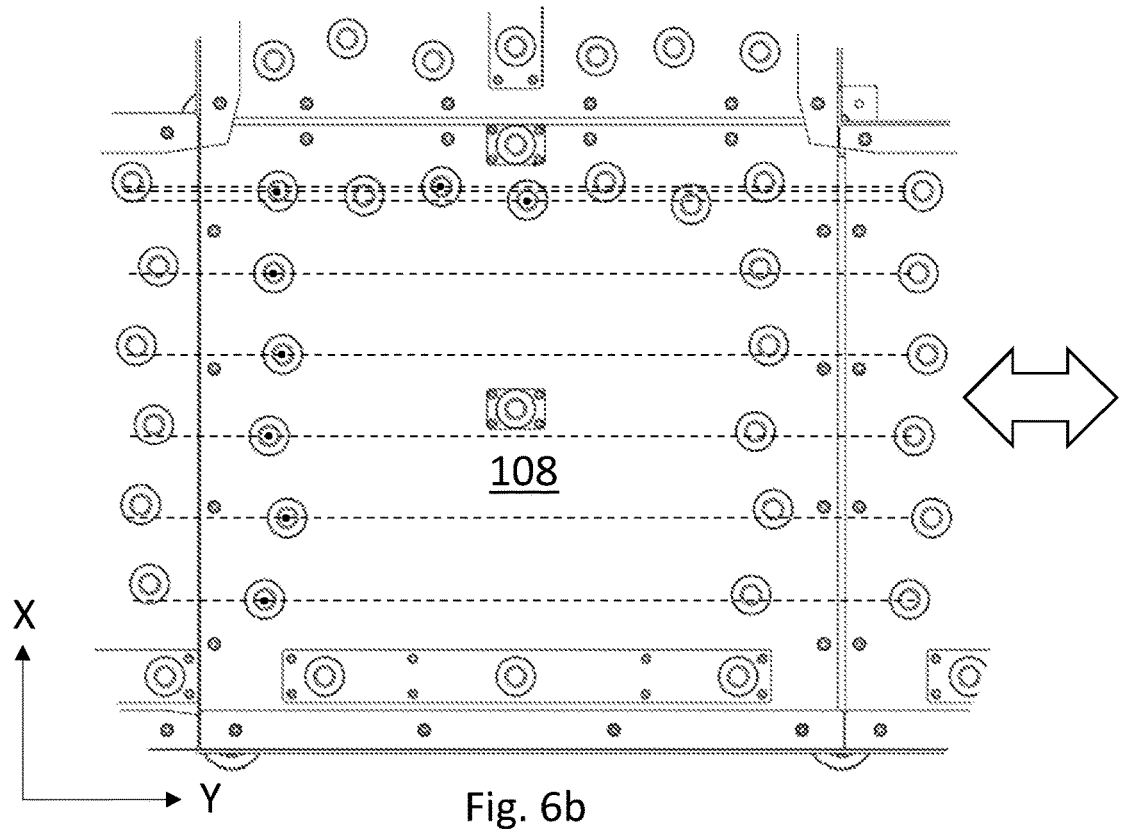
Figure 6C:
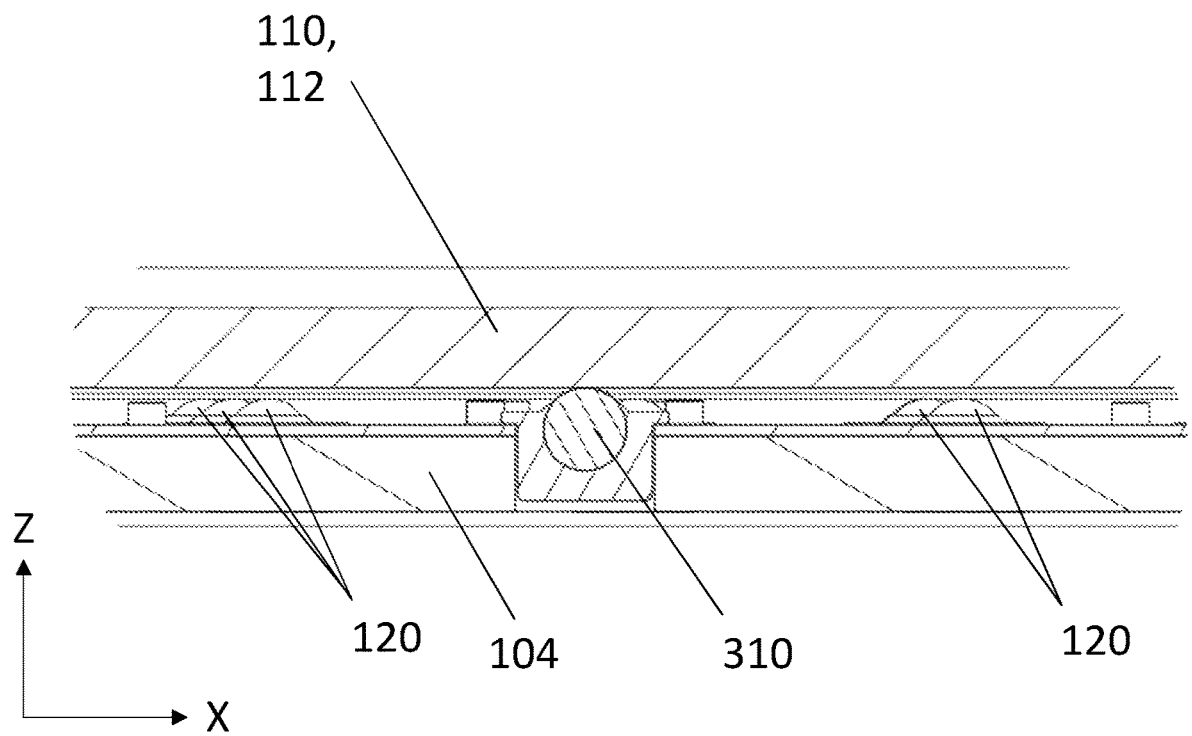

FIGS. 6*a* and 6*b* illustrate the arrangement of the load bearing members on the intermediate member;

FIG. 6*c* illustrates an arrangement of guide balls on a pallet bay relative to other non-guiding load-bearing balls.

Figure 8A:
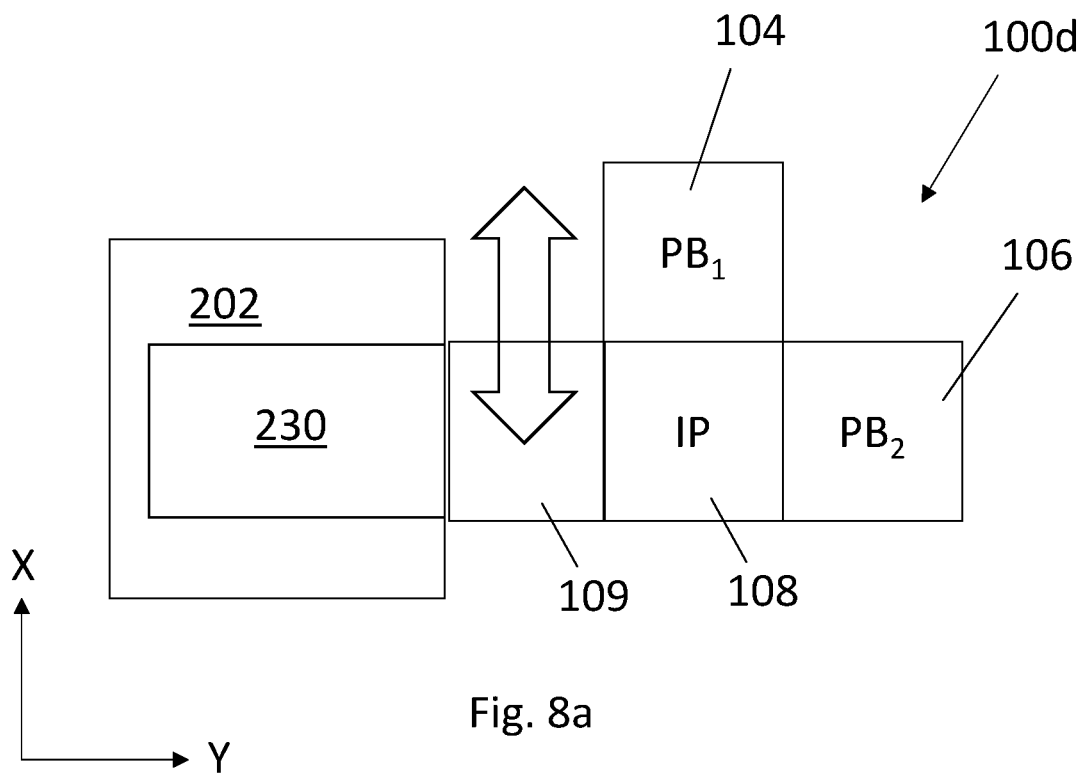
Figure 8B:
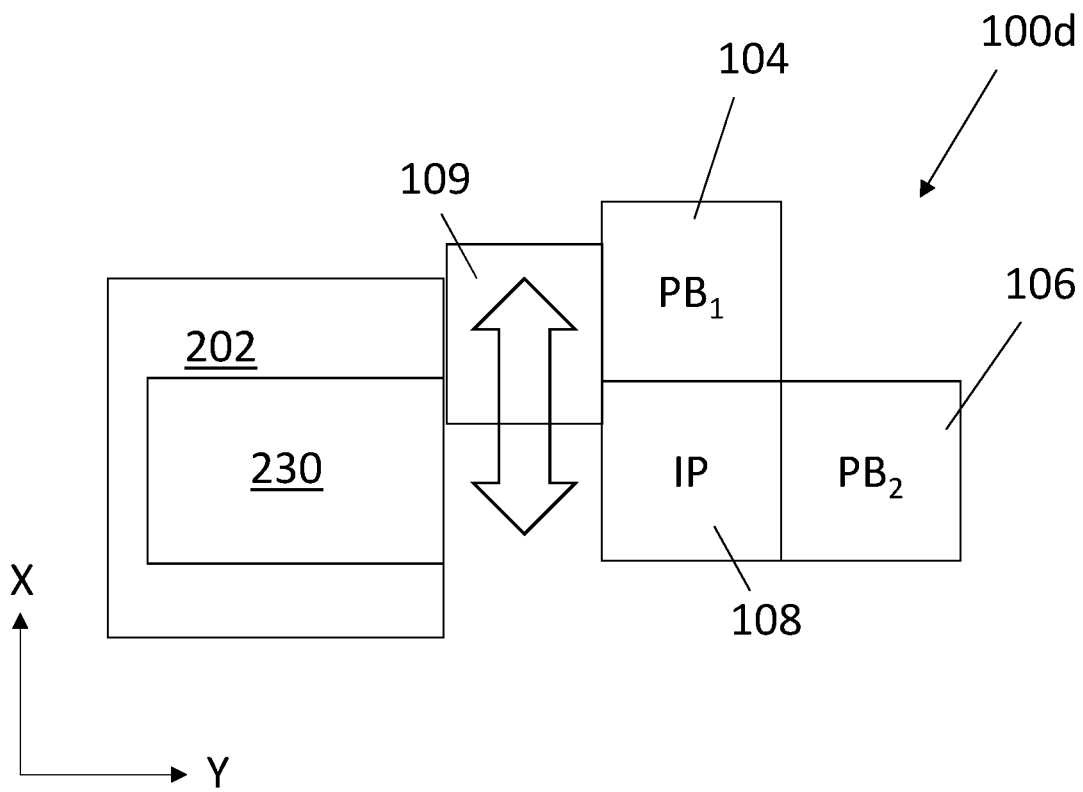
Figure 10:
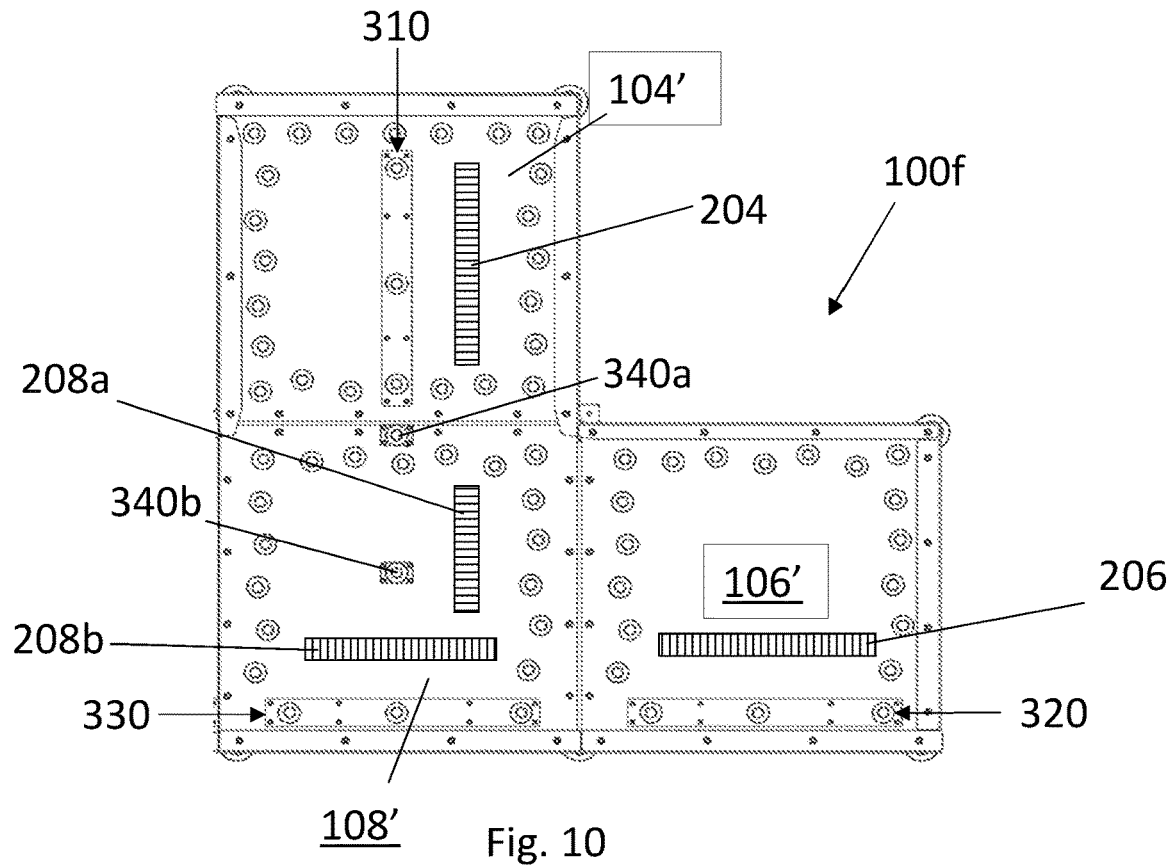
Figure 11:
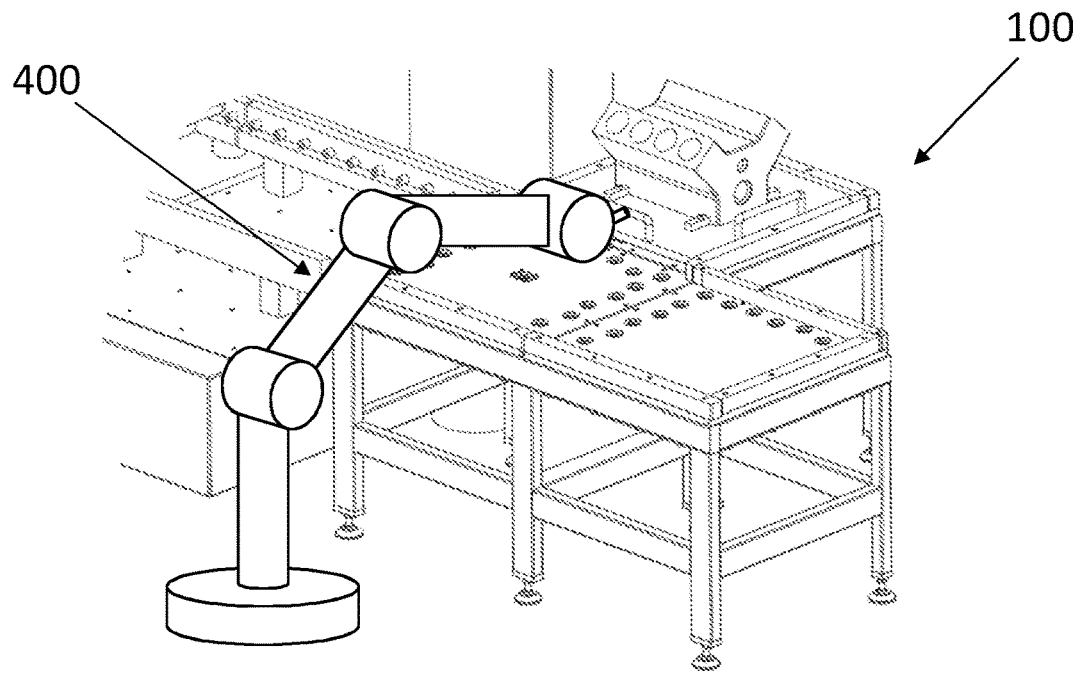

FIGS. 7*a* to 7*d* illustrate different configurations of pallet loaders according to the invention;

FIGS. 8*a* and 8*b* respectively illustrate plan views of a pallet loader with a retractable bridge according to a first embodiment, in its deployed and retracted positions;

FIGS. 9*a*, 9*b*, 9*c* and 9*d* illustrate isometric and plan views of a pallet loader with a retractable bridge according to a second embodiment, in its deployed and retracted positions;

FIG. 10 illustrates an example pallet loader comprising a mechanism for automatically moving a pallet around the pallet loader; and FIG. 11 illustrates a robot arm for automatically moving a pallet around a pallet loader.

Figure 1:
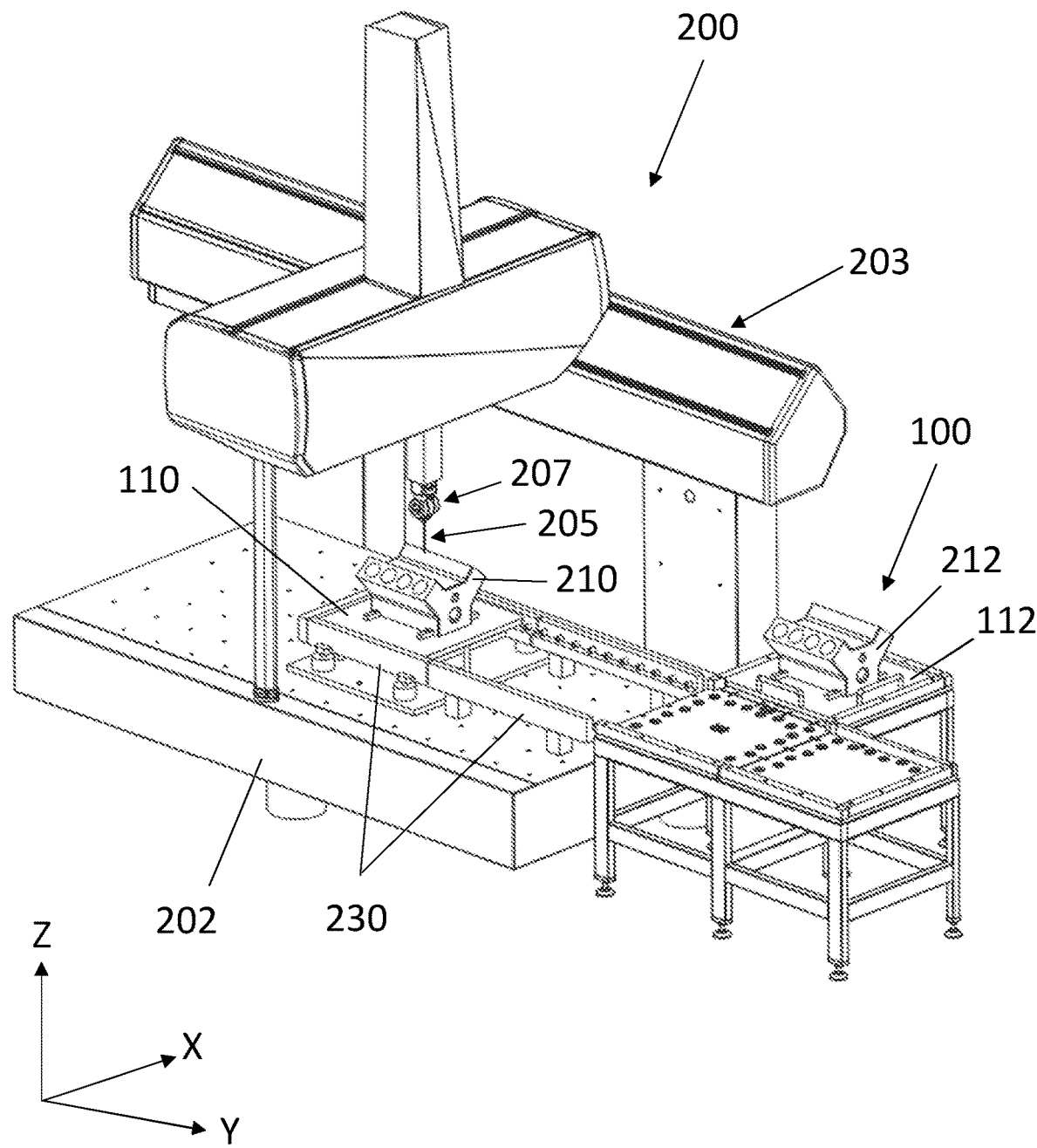
FIG. 1 illustrates a pallet loader according to the present invention, set up next to a coordinate measuring machine.

Referring to FIG. 1, there is shown a pallet loader 100 according to the present invention. The pallet loader is located adjacent a positioning apparatus 200, which in this embodiment comprises a gantry-type Cartesian coordinate measuring machine (CMM). In the particular example shown, the pallet loader 100 comprises a ball-table.

In the embodiment shown, the CMM 200 comprises a base 202 on which an artefact 210, 212 to be inspected can be placed, and a movement system 203 which provides for repeatable and accurate control of the position of an inspection device such as a probe 205 relative to the base 202 in three orthogonal linear degrees of freedom X, Y and Z.

In the particular example shown, an articulated head 207 is provided on the lower free end of the quill/z-column for carrying the probe 205. In this case, the articulated head 207 comprises two orthogonal rotational axes. Accordingly, in addition to the three orthogonal linear degrees of freedom X, Y and Z, the probe 205 can be moved about two orthogonal rotational axes (e.g. A and B axes). A machine configured with such an articulated head is commonly known as a 5-axis machine.

Articulated heads for tools and inspection devices are well known, and for example described in WO2007/093789. As will be understood, an articulated head need not necessarily be provided, and for example the probe 205 could be mounted to the quill/z-column via a fixed head which does not provide any rotational degrees of freedom. Optionally, the probe itself can comprise an articulated member so as to facilitate rotation about at least one axis.

As shown in FIG. 1, a pallet receiver/holder 230 is provided on the base 202 of the CMM 200. The pallet receiver/holder 230 receives a pallet from the pallet loader 100, and can hold the pallet 110 steady in the position shown in FIG. 1 whilst the workpiece 210 is being inspected by the CMM 200.

As will be understood, the pallet loader 100 could be used with a different type of apparatus, for example with manufacturing (e.g. machining) apparatus and/or with a different type of inspection/measurement apparatus. For instance, the pallet loader could be used with a: machine tool, bridge-type CMM, cantilever-type CMM, non-Cartesian positioning system, parallel kinematic system, and/or robot arm.

Figure 2:
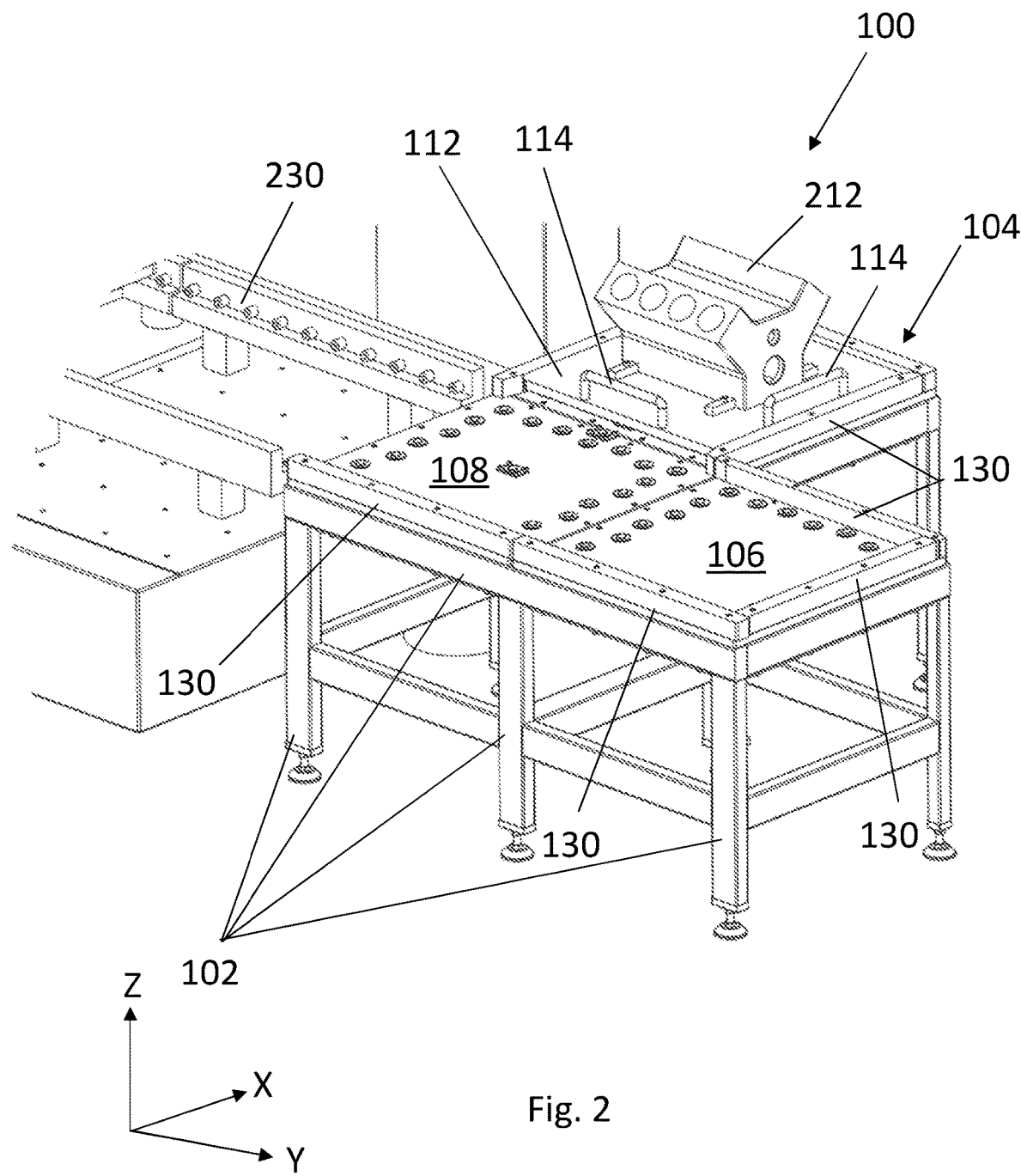
FIG. 2 illustrates a close-up view of the pallet loader of FIG. 1.
Figure 3:
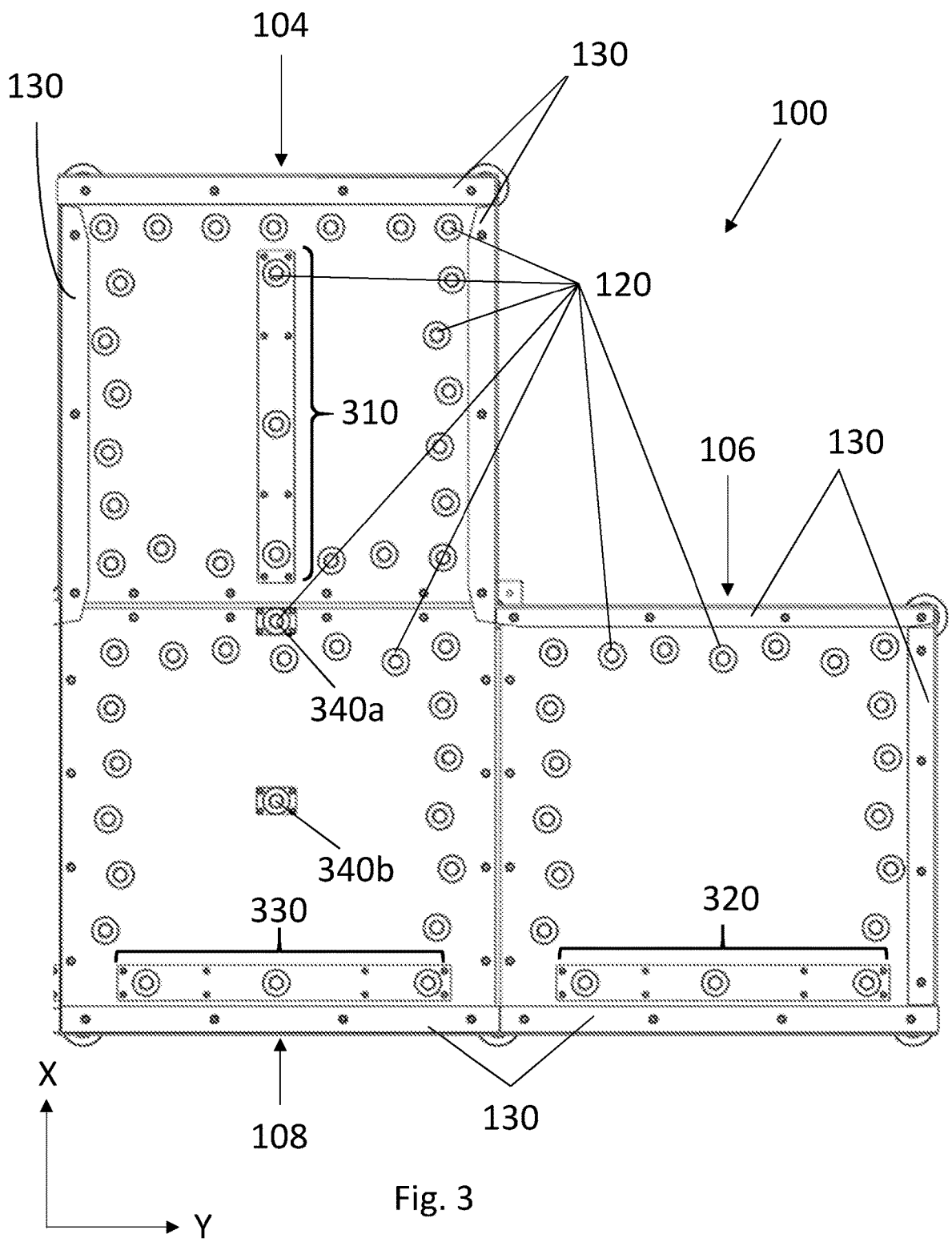
FIG. 3 illustrates a plan view of the pallet loader of FIG. 1.

Turning to FIGS. 2 and 3 the pallet loader 100 will be described in more detail. In summary, the pallet loader 100 comprises a table-like support structure 102 having a plurality of legs and feet for supporting a table top comprising (in this embodiment) two pallet bays 104, 106 and an intermediate (or "transfer") platform 108.

Each of the two pallet bays 104, 106 are capable of receiving and storing/retaining a pallet 110, 112 on which a workpiece 210, 212 can be loaded. Means for holding/retaining a pallet within a bay can be provided. For instance, the pallet bay could comprise one or more raised retaining features (e.g. balls) onto which a feature (e.g. dip/hole) on the underside of the pallet can ride over and onto.

As described in more detail below, a pallet 110, 112 can be moved/transferred between the pallet bays 104, 106 by driving it across the intermediate member 108. Also, a pallet 110, 112 can be driven/transferred from a pallet bay 104, 106, across the intermediate (or "transfer") platform 108 onto the pallet receiver 230 on the base 202 of the CMM 200 (and vice versa). Accordingly, in this embodiment, the so-called "transfer position" on the pallet loader (i.e. the position in which the pallet can be transferred from/to the loading apparatus to/from the CMM) is provided by the intermediate member 108.

Low-friction motion of the pallet 110, 112 across the pallet loader is facilitated by bearings (in this embodiment mechanical bearings), in particular by an array of balls provided on each of the pallet bays 104, 106 and intermediate member 108 which are free to rotate about all orthogonal axes of rotation. A few of the balls have been highlighted in FIG. 3 by reference numeral 120. Each ball is seated within a socket in which it is configured to spin as the pallet 110, 112 trundles over them, so as to provide a low-friction bearing between the ball and the pallet. As will be understood, in other embodiments, roller bearings could be used (in particular in the pallet bays 104, 106) instead of or as well as balls. Further still, in other embodiments, other types of bearings, such as air bearings could be used.

A pallet 110, 112 can be driven across the pallet loader via a pushing and/or pulling force on the pallet. For example, a human operator could push and/or pull a pallet 110, 112, for instance by way of handles 114 on the pallet. Optionally, an automated/motorised mechanism could be provided for driving a pallet 110, 112 into a different position.

The provision of at least two pallet bays 104, 106 and two pallets 110, 112 means that a second workpiece 212 can be loaded/unloaded onto/from the pallet loader in one of the bays, before a first workpiece 210 (e.g. which is being inspected by the CMM 200) is unloaded. For example, whilst the first workpiece 210 on a first pallet 110 is being inspected by the CMM 200, the second workpiece 212 can be loaded onto the second pallet 112 located in the first pallet bay 104 on the pallet loader 100. When the inspection of the first workpiece 210 is complete it can be driven off the CMM's pallet receiver 230, across the intermediate member 108, into the second pallet bay 106. This then allows the second workpiece 212 (which has already been loaded on the second pallet 112) to immediately thereafter be driven across the intermediate member 108, onto the CMM's pallet receiver 230, and inspection of the second workpiece 212 can take place straight away (e.g. without having to wait for the first workpiece 210 to be unloaded from its pallet 110).

In this particular embodiment, the pallets 110, 112 and some of the bearings 120 are configured such that the motion of a pallet across the pallet loader is guided by the interaction therebetween. In particular, as described in more detail below, the pallet bays 104, 106 and the intermediate member 108 each comprise a set of pallet guide bearing members (balls) which are arranged to interact with features (in this embodiment guide grooves) on the underside of a pallet so as to guide the lateral/sideways/horizontal position of the pallet as it is driven across the load bearing apparatus. In other words, the set of pallet guide bearing members (balls) and the features on the underside of the pallet can constrain the motion of a pallet to a particular path/degree of freedom (and prevent rotation and motion along a path/degree of freedom perpendicular thereto).

For example, referring to FIG. 3, the first pallet bay 104 comprises a first set of guide balls 310 (comprising a line of guide balls 310 extending in the x-dimension), the second pallet bay 106 comprises a second set of guide balls 320 (comprising a line of guide balls 320 extending in the y-dimension), and the intermediate member 108 comprises a third set of guide balls 330 (also comprising a lines of guide balls 330 extending in the y-dimension) and as well as a fourth set of guide balls 340 (comprising a pair of guide balls 340a, 340b arranged in a line extending parallel to the x-dimension). As explained in more detail below in connection with FIGS. 4 and 5, these sets of guide balls are configured to interact with guide grooves on the underside of the pallet so as to guide the motion of the pallet. As also explained in more detail below, in this embodiment, the balls which are part of a set of guide balls are raised slightly compared to the other balls (such that they protrude into the grooves on the underside of a pallet 110, 112).

Figure 4:
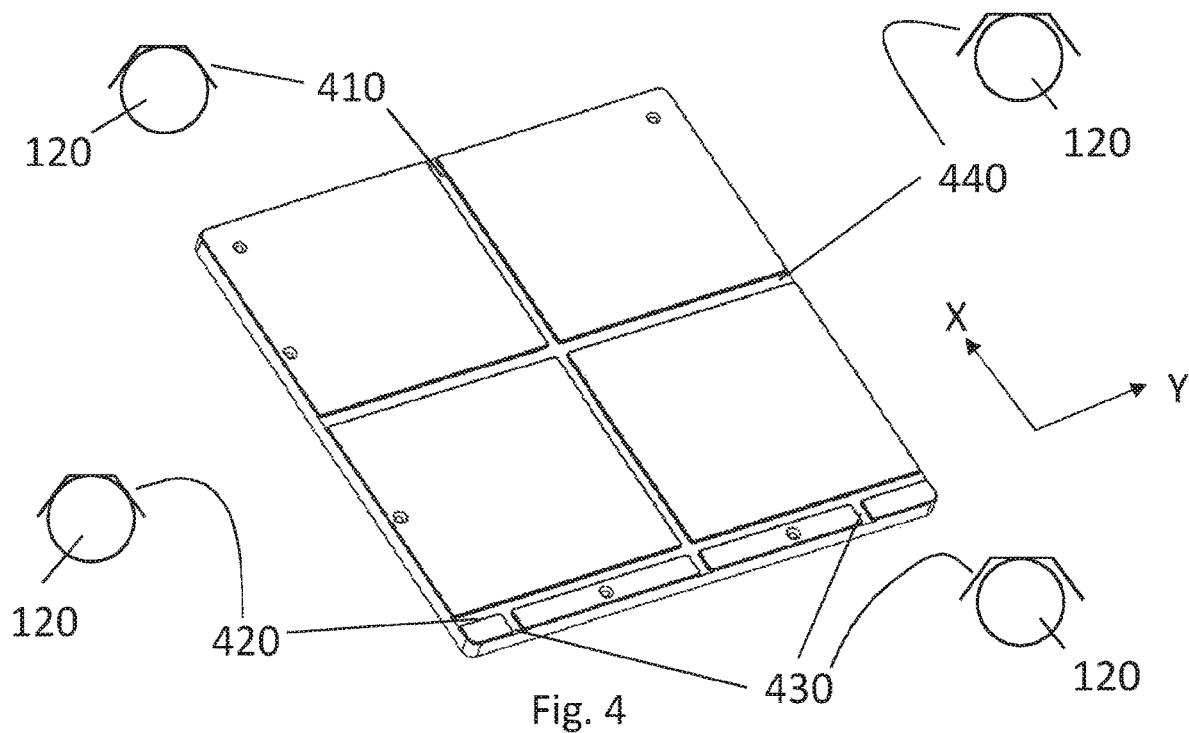
FIG. 4 illustrates the underside of the pallet.

Referring to FIG. 4, the underside of the pallet 110, 112 comprises a guide groove 410 extending parallel to the x-axis, and a guide groove 420 extending parallel to the y-axis. The underside of the pallet also comprises a first set of escape/access grooves 430 (extending parallel to the x-axis), and a second escape/access grove 440 (extending parallel to the y-axis).

As illustrated in FIG. 4, the width of the guide grooves 410, 420 is slightly narrower than that of the access grooves 430, 440. Making the access grooves wider means that there is some lateral play between themselves and the guide balls 120. This ensures that it is the guide grooves 410, 420 which provide the lateral constraint, and avoid the access grooves 430, 440 from over constraining the pallet, which could cause fighting between the grooves and bearing balls 120. However, as will be understood, this feature is optional and all the guide grooves and the access grooves could all have substantially the same width.

Accordingly, when a pallet 110, 112 is being driven into or out of the first pallet bay 104 (in the x-dimension), the first 310 set of guide balls on the first pallet bay 104 and the pair of guide balls 340a, 340b on the intermediate member 108 are received within the guide grooves 410 extending parallel to the x-axis on the underside of a pallet 110, 112, and thereby prevent rotation and lateral motion of the pallet (in the y-dimension); thereby guiding the pallet into/out of first the pallet bay. However, when a pallet 110, 112 is being driven into or out of the second pallet bay 106 (in the y-dimension), the second 320 and third 330 set of guide balls are received within the pallet's guide groove 420 which extends parallel to the y-axis, thereby preventing lateral motion of the pallet (in the x-dimension). Similarly, when the pallet is being moved into/out of the intermediate member out of/into the CMM's pallet receiver/holder 230 the third 330 set of guide balls are received within the pallet's guide groove 420 which extends parallel to the y-axis, thereby preventing lateral motion of the pallet (in the x-dimension).

Figure 5:
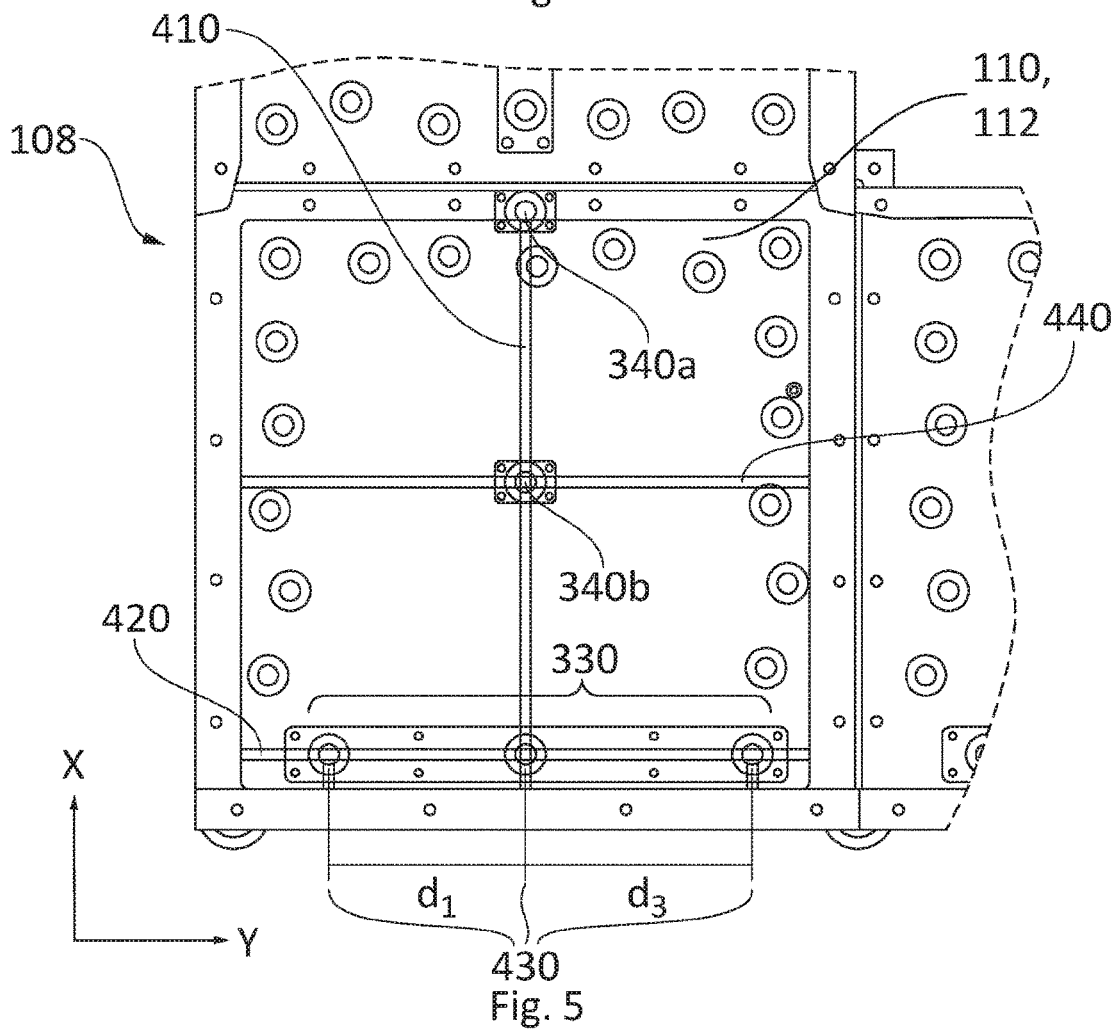
FIG. 5 illustrates the interaction of the features on the underside of the pallet with the pallet guide bearing members on the intermediate member of the pallet loader.

As illustrated in FIG. 5, the third set of guide balls 330 and the pallet's first set of escape/access grooves 430 all line up in only one relative y-position of the pallet and intermediate member (which could be referred to as a predetermined position). When in this position, a pallet 110, 112 can be moved into/out of the intermediate member 108 in the x-dimension (from/to the first pallet bay 104), because all of the balls in the third set of guide balls 330 are free to escape the pallet's single guide groove 420 and enter the pallet's first set of escape/access grooves 430. Accordingly, there is only one predetermined position along the y-dimension at which movement of the pallet 110, 112 in the x-dimension is permitted.

In this embodiment, the spacing $d_1$ and $d_2$ between adjacent/neighbouring guide balls in the third set of guide balls 330 (and also the corresponding spacing $d_1$ and $d_2$ between adjacent/neighbouring escape/access grooves in the pallet's first set of access grooves 430) are un-evenly/un-equally/uniquely spaced such that at any position other than the above mentioned predetermined position, not more than one guide ball in the third set of guide balls 330 lines up with an access groove.

Likewise, when a pallet 110, 112 is being moved into the intermediate member 108 along the x-dimension, it is only free to change direction and move along the y-dimension when the second guide ball 340*b* in the fourth set of guide balls 340 is lined up with the second escape/access grove 440 (extending parallel to the y-axis) and so is free to escape the guide groove 410 extending parallel to the x-axis (at which position the first guide ball 340*a* has also exited the guide groove 410 extending parallel to the x-axis and the and the third set of guide balls 330 are lined up with the guide groove 420 extending parallel to the y-axis).

Accordingly, as illustrated in FIG. 5, the guide features are configured such that they allow the pallet to change direction of travel (e.g. it can travel in either the x dimension toward the first pallet bay 104 or y dimension toward the second pallet bay 106 or toward the CMM 200) at a predetermined relative position.

The remaining balls (i.e. those balls 120 not in any of the above-mentioned sets of guide balls) are non-guiding load-bearing balls, configured to bear against the underside of the pallets 110, 112, so as to spread the load of the pallet and workpiece mounted thereon without constraining the lateral position of the pallet. These non-guiding load-bearing balls are mounted slightly lower than those guide balls so that they do not become captured by the guiding or access grooves on the underside of the pallet as the guiding and escape/access grooves pass over the non-guiding load-bearing balls.

A pallet guiding arrangement such as that described above means that the pallet (and workpiece loaded thereon) is significantly less likely to hit or rub against side-safety barriers 130 (which are provided around the edge of the pallet-loading apparatus in case the pallet pops out of the lateral guiding arrangement). Accordingly, the lateral guiding arrangement can make it easier for a person to drive the pallet around the pallet loader, and also make it less likely that the pallet will crash against a side-safety barrier 130 (which could damage the pallet, pallet loader and/or workpiece, and/or hurt an operator). Furthermore, if desired, the side-safety barriers 130 could be positioned further out than that shown in the Figures, such that the pallet is not such a snug-fit between the side-safety barriers 130, for example so as to omit the potential of a finger-trap. In other words, the pallet and side-safety barriers 130 could be sized and configured such that when the pallet is located in a pallet bay or on the intermediate member, there is a gap sufficient to avoid fingers being trapped between the pallet and a side-safety barrier (e.g. such that there is a gap of at least 25 mm).

As will be understood, other embodiments of the pallet loader might not have such guide features on the underside of the pallets, in which case all of the bearing members which engage/cooperate with the underside of the pallet could be just non-guiding load-bearing bearing members.

FIGS. 6*a* and 6*b* illustrate another advantageous aspect of the described pallet loader. In particular, these figures highlight how that the non-guiding load-bearing balls are staggered relative to each other such that the non-guiding load-bearing balls are not aligned in the directions in which a pallet can travel (e.g. in the case of the intermediate member 108, in the x and y-dimensions). For instance, as shown in FIG. 6*a*, a plurality of dashed lines have been drawn. Each dashed line extends in the x-dimension, through the centre of one of the non-guiding load-bearing balls (highlighted by the dot in the centre of one of the non-guiding load-bearing balls), but does not extend through the centre point of another non-guiding load-bearing ball. Accordingly, when a pallet moves over the intermediate member 108 in the x-dimension, each non-guiding load-bearing balls travels along/bears against a different line on the underside of the pallet, thereby helping to avoid a track being worn into the underside of the pallet. This also means that when a pallet moves over the intermediate member 108 in the y-dimension, the pallet does not board or dismount more than one guide ball simultaneously; rather the pallet boards dismounts the guide balls in a staggered/sequential fashion. This helps to provide for smooth movement of the pallet in the y-dimension.

As shown, in FIG. 6*b*, the non-guiding load-bearing balls which are spaced apart in the y-dimension have also been arranged in the same way (i.e. such that no non-guiding load-bearing balls line up in the y-dimension).

As mentioned earlier in the description, and as shown in FIG. 6*c*, the guide balls 310 (and 320, 330 and 340) are mounted so that they are raised slightly compared to the other non-guiding load-bearing bearing balls 120, such the guide balls 310 protrude into the grooves on the underside of a pallet 110, 112, and thereby act to restrict/prevent motion of the pallet 110, 112 perpendicular to the grooves, and thereby guide the motion of the pallet 110, 112.

Figure 7A:
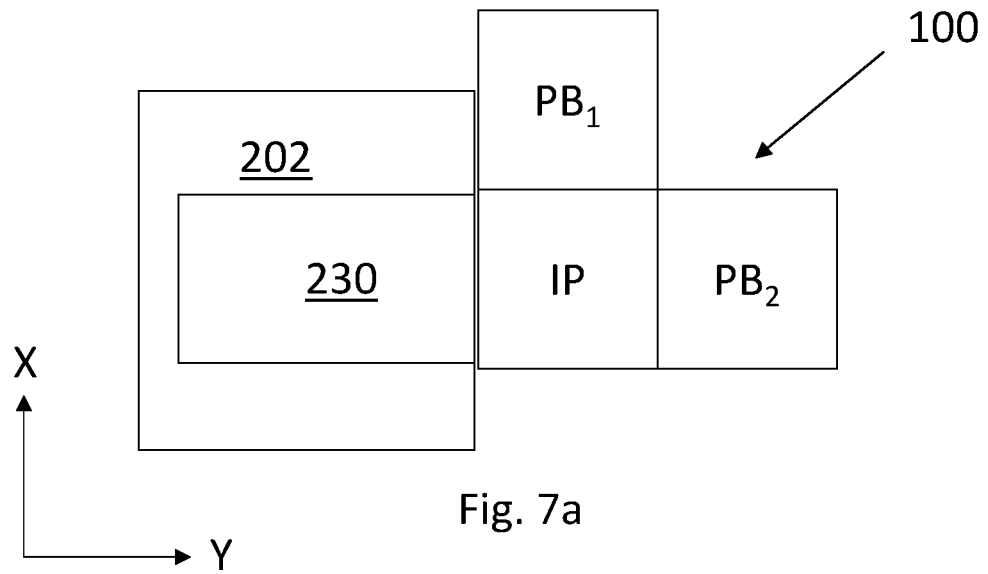
Figure 7B:
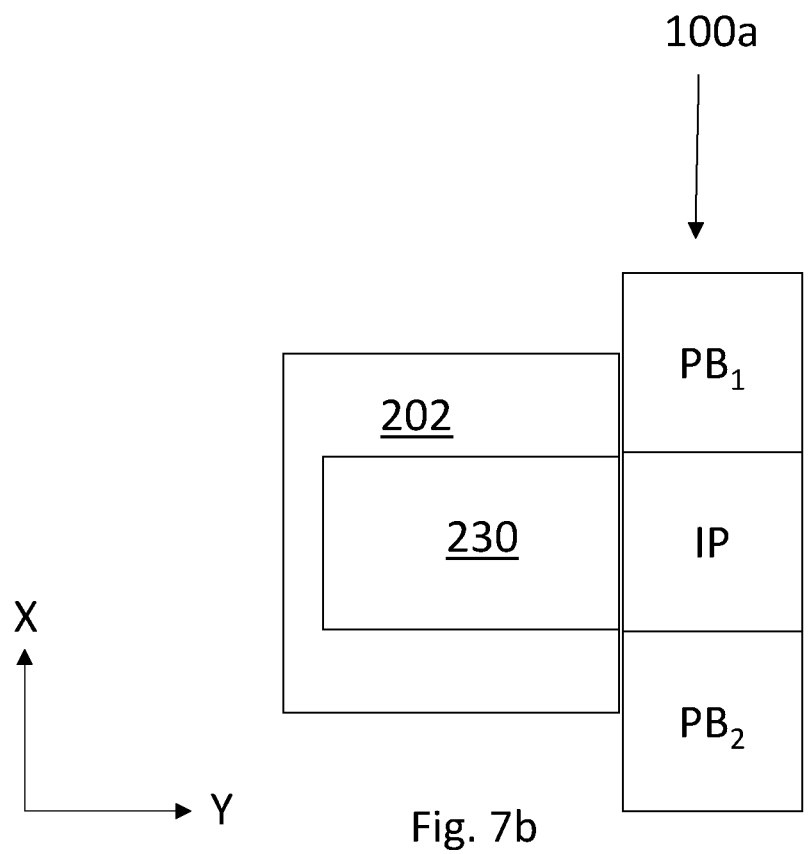
Figure 7C:
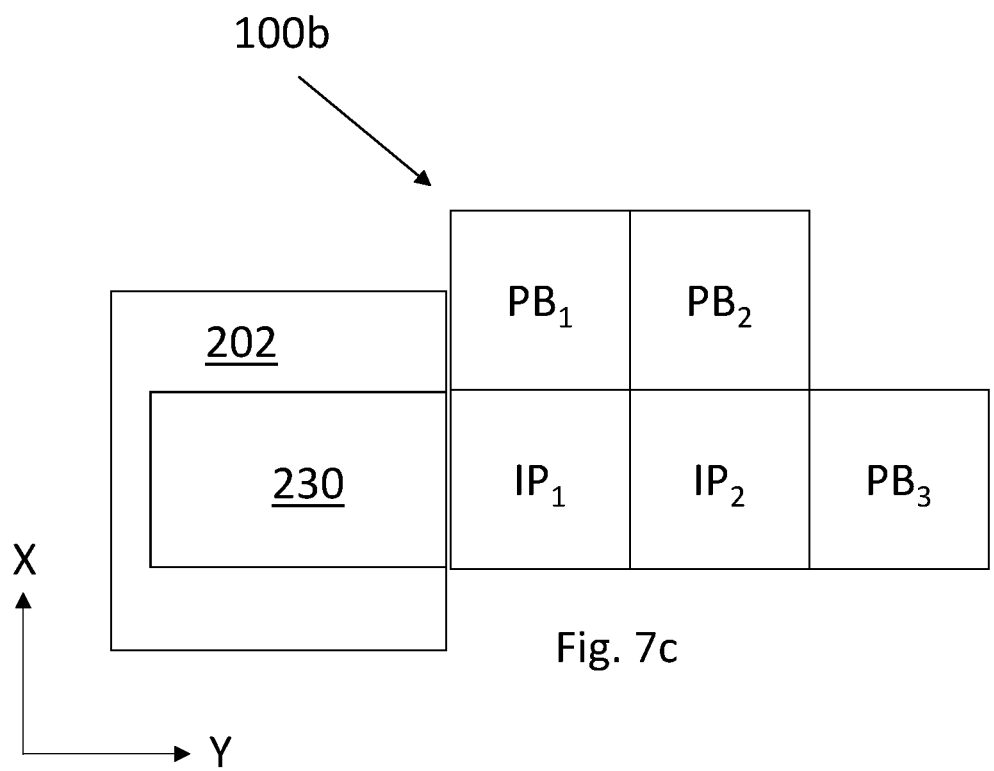
Figure 7D:
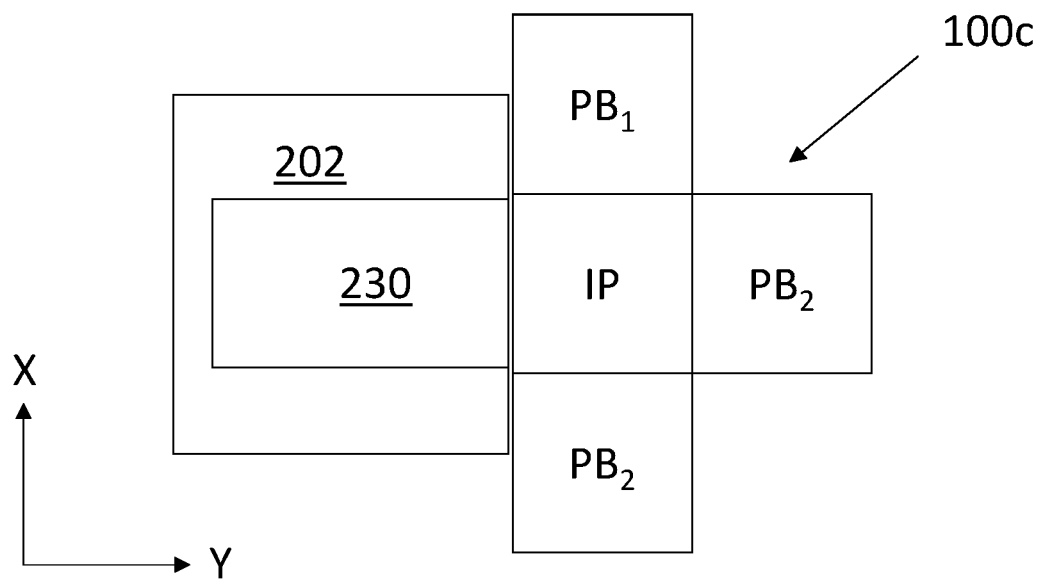

FIGS. 7*a* to 7*d* illustrate different possible configurations of a pallet loader according to the present invention. FIG. 7*a* illustrates the configuration described above in connection with FIGS. 1 to 6 (in which there are two pallet bays "PB$_1$", "PB$_2$" and one intermediate member "IP"). FIG. 7*b* illustrates how that the two pallet bays "PB$_1$", "PB$_2$" could be arranged on opposing sides of the intermediate member "IP". FIGS. 7*c* to 7*d* illustrate how more than two pallet bays could be provided.

Figure 9A:
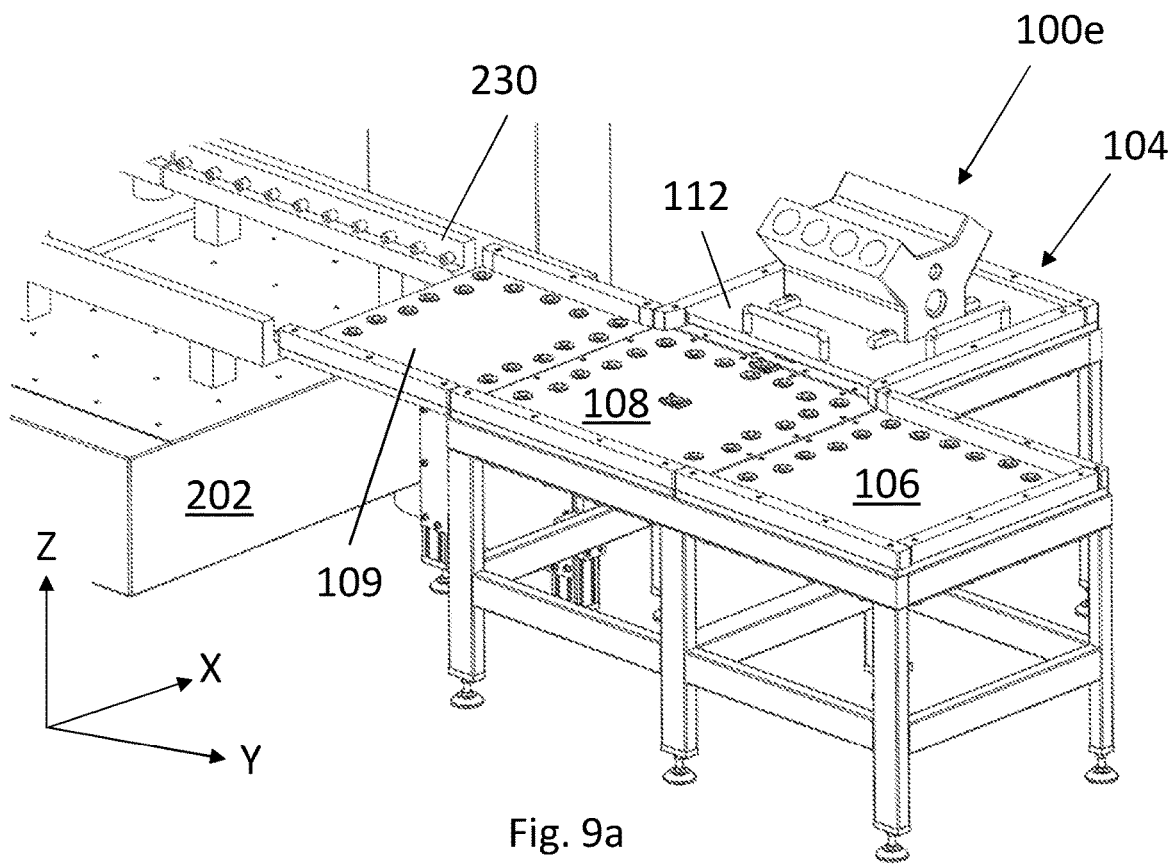

FIGS. 8*a*, 8*b*, and 9*a* to 9*d* illustrate how that a pallet loader 100*d*/100*e* could comprise a retractable bridge/transfer member 109 between the intermediate member 108 and the CMM's pallet receiver/holder 230. As illustrated in FIGS. 8*a* and 9*a*, the retractable bridge109 is in its deployed position, acting as a bridge between the intermediate member 108 and the CMM's pallet receiver/holder 230 such that a pallet 112 (not shown in FIGS. 8*a* and 8*b*) can be driven onto/off the CMM's pallet receiver 230 from/to the intermediate member 108. In this embodiment of FIG. 8, the retractable bridge 109 is slidable on bearings (e.g. linear/roller bearings) in the x-dimension to a retracted position, illustrated in FIG. 8*b*.

Figure 9B:
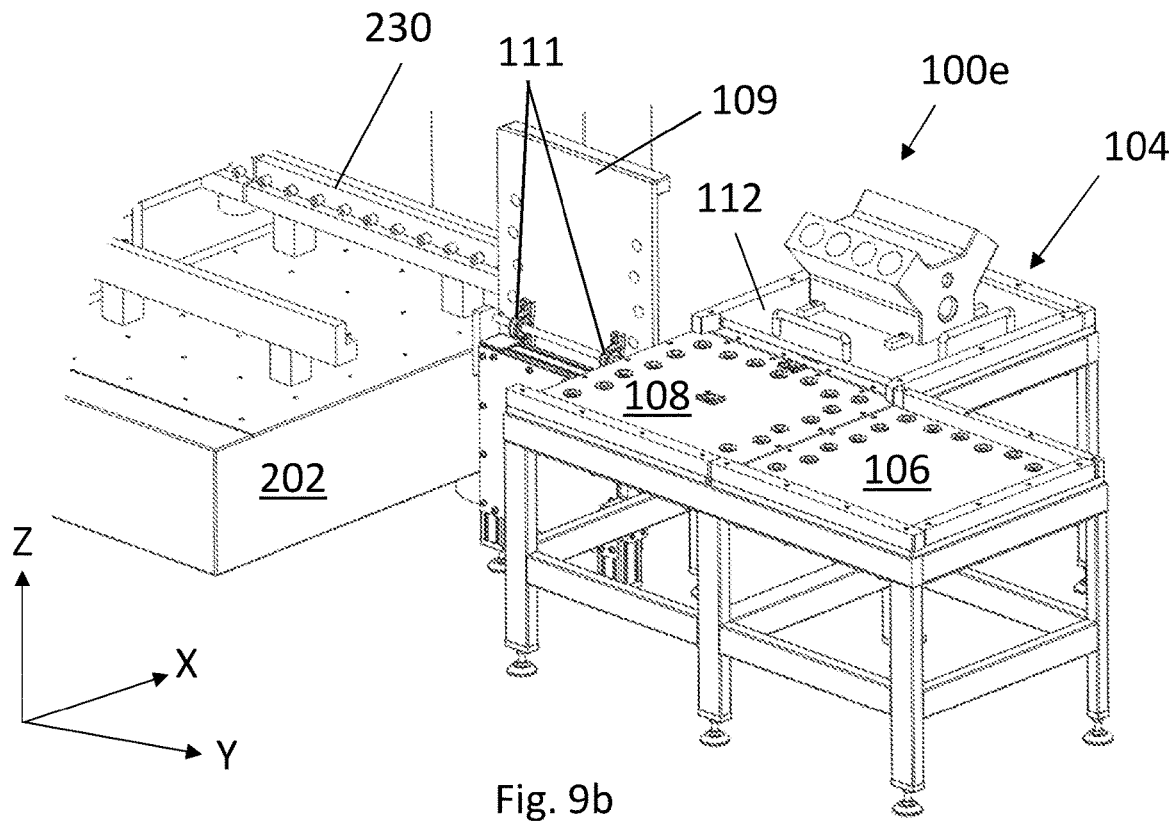
Figure 9C:
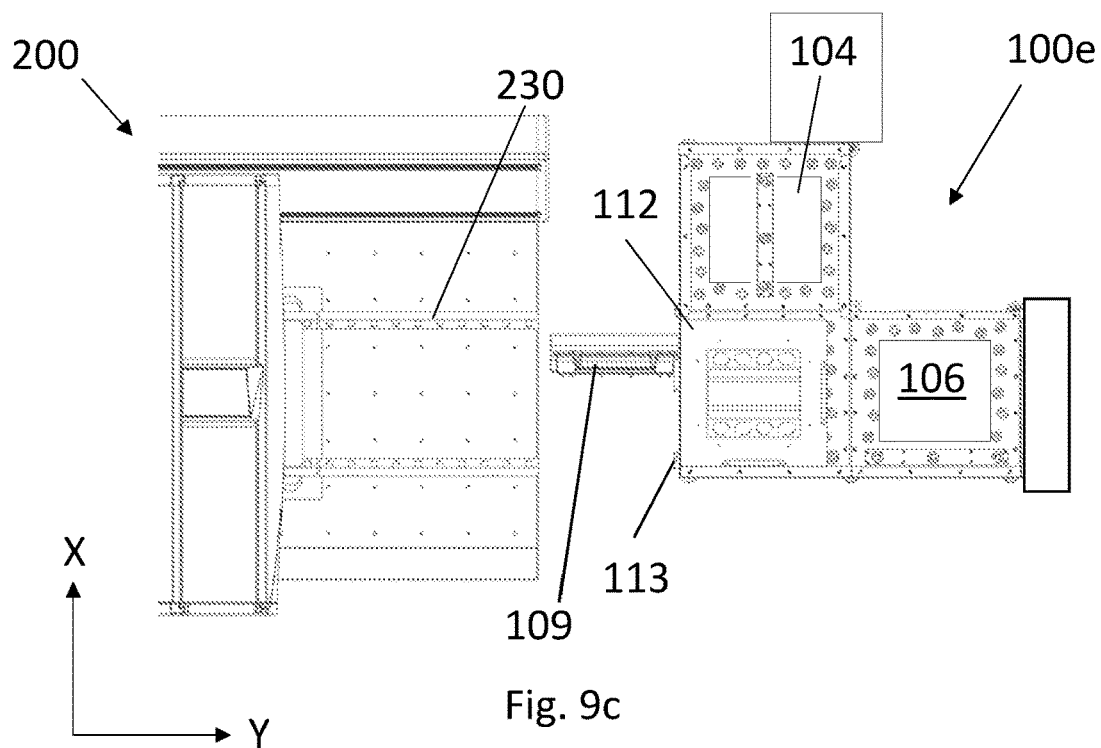
Figure 9D:
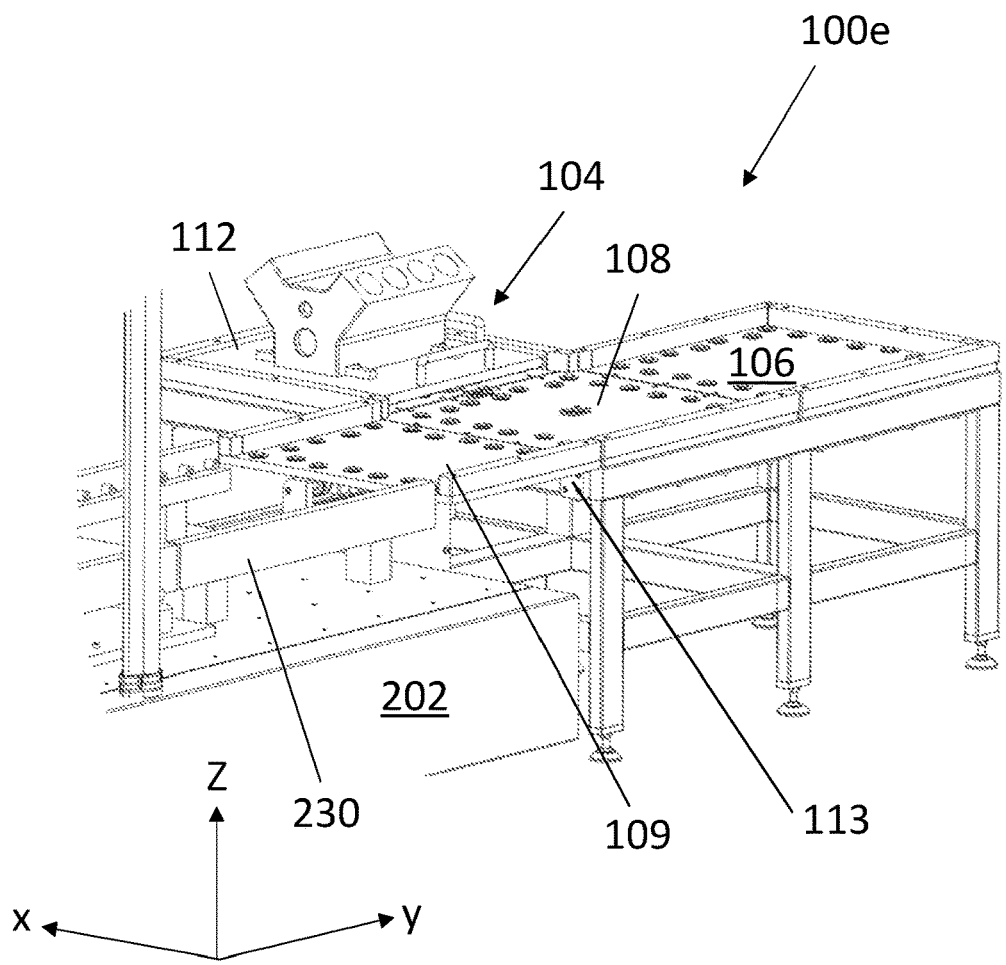

As will be understood, the retractable bridge 109 could be displaceable between deployed and retracted positions by motion other than sliding. For example, as illustrated in FIGS. 9*a* and 9*b*, a hinge mechanism 111 could be provided such that the retractable transfer member 109 could pivot between a deployed and retracted position, for instance like a draw-bridge. As shown in FIGS. 9*c* and 9*d*, a ledge 113 can be provided on which the retractable transfer member 109 can rest and be supported when in its deployed position.

In the retracted position, a person/operator is able to stand in the space between the intermediate member 108 and the CMM's pallet receiver/holder 230. Accordingly, this configuration provides improved access to CMM's measurement volume from the end adjacent the pallet loader. As illustrated in FIGS. 8*b* and 9*b*, in these embodiments, in their fully retracted position, at least a part of the retractable transfer member 109 still overlaps the intermediate member 108 such that it prevents a pallet from leaving intermediate member 108 in the direction of the retractable transfer member 109 and also prevents a pallet from leaving the CMM's pallet receiver/holder 230 (and therefore prevents a pallet from falling off the pallet loader or CMM even when the retractable transfer member 109 is fully retracted). This is achieved by designing the pallet loader such that the retractable bridge 109 blocks the pallet's exit from the intermediate member 108/CMM pallet receiver/holder 230. As will be understood, a catch/lock mechanism could be provided for holding the retractable transfer member 109 in its deployed and/or retracted position(s).

The above embodiments depict a manually operated system, in which a user manually pushes and/or pulls a pallet around the pallet loader. As will be understood, automatic pallet loader systems are known, and indeed it has been found that the cooperating guide features on the underside of the pallet can be particularly advantageous for such automatic pallet loader systems. FIG. 10 illustrates one example of an automatic pallet loader system. In this embodiment, the pallet loader 100f itself comprises a mechanism for automatically moving a pallet around the pallet loader. In particular, in this embodiment, each of the pallet bays 104', 106' and the intermediate member 108' comprise conveyor belts 204, 206, 208a, 208b which are configured to engage the underside of a pallet, and can be operated under the control of motors (not shown) to move a pallet.

For example, conveyor belt 204 on the first pallet bay 104' can be used to move a pallet into/out of the first pallet bay 104'. For instance, the conveyor belt 208a on the intermediate member 108' can be used to drive a pallet on the intermediate member 108' toward the first pallet bay 104' in order to move the pallet into the first bay 104. Once the pallet is located over the conveyor belt 204 on the first pallet bay 104', the conveyor belt 204 on the first pallet bay 104' can then also be used to pull the pallet fully into the first pallet bay 104'. In such an embodiment, it could be preferred that on the intermediate member 108' the conveyor belts 208a and 208b are configured to provide reduced friction in a direction transverse to their operating direction, in order to ease movement of a pallet which is travelling transverse to their operating direction. This could be achieved, for instance, by the configuration of the conveyor belt and/or for example by using conveyor belts which can be raised and lowered away from the pallet.

FIG. 11 illustrates a different example of an automatic pallet loader system. In this case, the pallet loader 100 does not have any in-built or integral automatic driving means. Rather, an external driving means is provided. In particular, in this embodiment a robot arm which can be automatically driven is provided, which comprises a manipulator at its free end for engaging the pallet such that it can push and pull the pallet around the pallet loader and onto/off the CMM.

In both the embodiments of FIGS. 10 and 11, the provision of the cooperating guide features on the underside of the pallet and on the pallet loader is particularly advantageous because it can significantly reduce the burden on the drive mechanism to keep the pallet moving in the desired direction and orientation. For instance, the guides of the described embodiments avoids the need for the automatic drive mechanism to provide any rotational and lateral stiffness relative to the desired direction of motion needed to avoid the pallet crashing into/rubbing against the side-safety barriers 130, and to avoid the pallet unintentionally drifting into a pallet bay as it moves past the pallet bay. For example, the cooperating guide features can resist a pallet drifting/rotating into the first pallet bay 104 whilst it is being driven from the second pallet bay 106 to the CMM (or vice versa) across the intermediate member 108.

In the embodiments shown, the pallet bays and intermediate member(s) each comprise a solid/continuous surface on which the bearings are provided. As will be understood, this need not necessarily be the case. For instance, the pallet bays and intermediate member(s) could be provided by a frame-like arrangement on which the bearings are provided.

In the embodiments shown, the guide features on the pallet table comprise ball bearings and the corresponding guide features on the pallet comprises channels. However, this need not necessarily be the case and other configurations are possible. For instance, the pallets 110, 112 could comprise an array of ball bearings (e.g. both guiding and non-guiding ball bearings) and the intermediate member 108 and pallet bays 104, 106 could comprise corresponding arrays of channels within which the pallet's ball bearings can be captured so as to guide the pallet.

The invention claimed is:

1. An apparatus comprising:
at least one pallet; and
at least one pallet loader for storing a plurality of pallets which can be transferred from the pallet loader onto a positioning apparatus' pallet receiving member which is located adjacent the pallet loader, the pallet loader comprising at least two pallet bays and at least one intermediate member, arranged such that a pallet can be driven across the intermediate member i) from one pallet bay to another, and ii) from one pallet bay to a positioning apparatus, wherein
the apparatus further comprises cooperating guide features on an underside of the at least one pallet and on one or more of the intermediate member and pallet bays for guiding the pallet along a predetermined path and/or for controlling rotational orientation of the pallet about a vertical axis, as the pallet moves across the intermediate member/pallet bay, and
the intermediate member is configured to be immovable relative to the at least two pallet bays.

2. The apparatus as claimed in claim 1, wherein the cooperating guide features are configured such that, at least on the intermediate member, the pallet can escape from the predetermined path, at least at one predetermined position along the predetermined path, such that the pallet can be moved along a different path.

3. The apparatus as claimed in claim 1, wherein the cooperating guide features are configured to allow the pallet to change the path along which it can move, such that at a predetermined position the pallet can be moved out of the intermediate member and into a pallet bay which is located laterally with respect to the path along which the pallet is guided.

4. The apparatus as claimed in claim 1, wherein at least one of the cooperating guide features is also configured to support at least a proportion of the weight of the pallet.

5. The apparatus as claimed in claim 1, wherein the cooperating guide features comprise at least one channel provided on the pallet or on one or more of the intermediate member and pallet bays.

6. The apparatus as claimed in claim 1, wherein the cooperating guide features comprise at least one rotatable member on the pallet or on one or more of the intermediate member and pallet bays.

7. The apparatus as claimed in claim 1, further comprising means for automatically driving a pallet around the pallet loader.

8. The apparatus as claimed in claim 1, wherein one or more of the intermediate member and pallet bays comprise a plurality of non-guiding load-bearing bearing members which are arranged to support at least a proportion of the pallet's weight but so as to not provide any lateral guidance as the pallet moves relative to the pallet bay/intermediate member.

9. The apparatus as claimed in claim 8, wherein on one or more of the intermediate member and pallet bays, the non-guiding load-bearing bearing members are staggered relative to each other such that no non-guiding load-bearing bearing members are aligned in the direction(s) in which a pallet can travel thereon.

10. An The apparatus as claimed in claim 8, wherein the pallet and/or the non-guiding load-bearing bearing members are configured such that a pallet mounts or dismounts not more than half of the non-guiding load-bearing bearing members simultaneously, as the pallet moves across a pallet bay or intermediate member.

11. The apparatus as claimed in claim 8, wherein on one or more of the intermediate member and pallet bays, the non-guiding load-bearing bearing members are staggered relative to each other such that no non-guiding load-bearing bearing members are aligned in the direction(s) perpendicular to which a pallet can travel thereon.

12. The apparatus as claimed in claim 1, further comprising at least one retractable bridge which can be changed between a deployed position, in which the bridge provides a path for a pallet to be driven across it such that a pallet on the pallet loader can be moved onto a positioning apparatus (and vice versa), and a retracted position.

13. The apparatus as claimed in claim 12, wherein in the retracted position, the retractable bridge blocks exit of a pallet from the pallet loader and/or the positioning apparatus, such that a pallet cannot fall off the pallet loader and/or the positioning apparatus into a space which is normally occupied by the retractable bridge when the retractable bridge is in its deployed position.

14. A system, comprising:
   a positioning apparatus for inspecting and/or working on a workpiece; and
   the apparatus according to claim 1,
   wherein the pallet loader is located adjacent to the positioning apparatus for storing pallets that can be moved to and from the positioning apparatus.

\* \* \* \* \*